United States Patent [19]

Bankuty et al.

[11] Patent Number: 4,907,700

[45] Date of Patent: * Mar. 13, 1990

[54] APPARATUS FOR TESTING THE RELEASE TORQUE OF CONTAINER CAPS

[75] Inventors: Geza E. Bankuty; LeRoy F. Byron, both of Easton; Joseph J. Cianciullo, West Haven, all of Conn.

[73] Assignee: New England Machinery, Inc., New Haven, Conn.

[ * ] Notice: The portion of the term of this patent subsequent to Mar. 14, 2006 has been disclaimed.

[21] Appl. No.: 263,560

[22] Filed: Oct. 27, 1988

Related U.S. Application Data

[63] Continuation of Ser. No. 153,211, Feb. 8, 1988, Pat. No. 4,811,850.

[51] Int. Cl.$^4$ .......................... B07C 5/34; G01L 5/00
[52] U.S. Cl. ........................ 209/546; 53/53; 73/52; 73/862.22; 73/862.23; 209/529; 209/571; 209/597
[58] Field of Search ............... 209/509, 522, 523, 529, 209/530, 546, 549, 552, 571, 597, 599, 913, 934; 53/53, 318, 331.5; 73/52, 862.21, 862.22, 862.23

[56] References Cited

U.S. PATENT DOCUMENTS

| | | | |
|---|---|---|---|
| 2,337,951 | 12/1943 | Whitehead | 73/847 |
| 3,249,221 | 5/1966 | Kennedy et al. | 209/552 |
| 3,813,933 | 6/1974 | Weiss et al. | 73/862.21 X |
| 3,866,463 | 2/1975 | Smith et al. | 73/862.19 X |
| 4,306,448 | 12/1981 | Rohde | 209/529 X |
| 4,315,427 | 2/1982 | Leiter et al. | 209/529 X |
| 4,511,044 | 4/1985 | Connor et al. | 209/529 X |
| 4,674,340 | 6/1987 | Burt et al. | 73/862.23 |
| 4,696,144 | 9/1987 | Bankuty et al. | 53/331.5 |
| 4,716,772 | 1/1988 | Bubeck et al. | 73/862.23 |

FOREIGN PATENT DOCUMENTS

| | | | |
|---|---|---|---|
| 2480940 | 10/1981 | France | 73/862.21 |
| 55-6268 | 1/1980 | Japan | 73/862.21 |
| 55-129717 | 10/1980 | Japan | 73/862.21 |

*Primary Examiner*—Dennis H. Pedder
*Assistant Examiner*—Edward M. Wacyra
*Attorney, Agent, or Firm*—Lerner, David, Littenberg, Krumholz & Mentlik

[57] ABSTRACT

An apparatus is provided for non-destructively testing for a predetermined minimum release torque of container caps on containers at a torque testing station. The apparatus includes a device for clamping the containers at the torque testing station; a device for grasping the caps of the containers at the torque testing station; a device connected to the cap grasping device for applying a release torque to the container caps; and, a device including a strain gage coupled to the release torque applying device for sensing the level of release torque applied to the caps and providing a signal indicative of such level. The apparatus also includes selectively operable controls for destructively testing selected capped containers, on a sampling basis, to determine the actual release torque of the container caps on such containers.

8 Claims, 13 Drawing Sheets

APPARATUS FOR TESTING THE RELEASE TORQUE OF CONTAINER CAPS

This is a continuation of application Ser. No. 153,211, filed Feb. 8, 1988 now U.S. Pat. No. 4,811,850.

BACKGROUND OF THE INVENTION

This invention relates to apparatus for testing the release torque of container caps and, more particularly, to container cap torque testers having improved apparatus therein for testing for and identifying improperly capped containers.

Container cap torque testers are commonly used in connection with commercial container filling lines wherein plastic, glass or metal containers are filled with liquids or powders and then automatically capped by machinery which clamps the containers at a work station and rotates threaded container caps onto the containers at the work station.

Variations in the torque with which the caps are tightened onto the containers occur during the capping process for a number of reasons, including changes in manufacturing tolerances for the threaded container caps and containers, variations in pneumatic line pressures and electrical voltages employed in the machinery used in the container capping operation, wear on the container clamping and/or cap grasping members employed therein, and changes in ambient temperature and humidity during the container capping operation.

The variations in the torque with which the caps are tightened onto the containers results in the subsequent arising of potentially significant problems in connection with the handling and/or usage of the capped containers. For example, containers having insufficiently torqued container caps are subject to leakage during packing and shipping, and containers having caps which are excessively torqued present problems for the ultimate consumer when he or she attempts to remove the container cap to use the product therein.

Heretofore, torque testers have been employed to check the torque level at which container caps have been applied to containers. One example of conventional torque testing apparatus comprises a hand held, manually-operated torque tester which is utilized to selectively sample the release torques of a small percentage of the capped containers that are produced by a container filling and capping line. Its use involves applying sufficient torque to the container cap to break the seal between the cap and its container in order to obtain the release torque reading. Accordingly, the container cap is opened relative to the container and this form of torque testing apparatus thus employs destructive testing of each of the selected containers, and a time consuming, manual operation, as well. Moreover, the accuracy of such hand held manually-operated torque testers is limited due to the fact that variations in readings are obtainable based o user-controlled functions such as, for example, the speed with which the user applies de-capping torque to the container cap, alignment between the container cap and the torque applying instrument, ambient conditions, and the like.

More recently, the operation of container cap torque testers has been mechanized to eliminate some of the problems associated with the earlier, manual forms of torque testers. One example of such a mechanized torque tester is shown in U.S. Pat. No. 4,696,144 to Geza E. Bankuty and LeRoy F. Byron, which is assigned to the assignee of the present application. In U.S. Pat. No. 4,696,144 an automated torque tester is disclosed which is capable of being installed in a container filling and capping line so that it can provide continuous, non-destructive torque testing with respect to the entire production of filled and capped containers produced by the line. Although the torque tester exemplified by the foregoing patent represents a significant improvement over the earlier, manual torque testers, which employed selective sampling and destructive testing of the samples selected, the accuracy of the later torque tester, while greatly improved over that of the manual earlier versions of torque testers, is still less than optimum due to the fact that a cumbersome cap grasping and torque applying mechanism is employed therein which introduces errors (as much as 2 inch-pounds) and spikes (which may be seen on an oscilloscope) into the torque readings.

It is, therefore, a primary object of this invention to provide improved apparatus for testing the release torque of container caps.

Another object of this invention is to provide improved apparatus for testing for a predetermined minimum release torque of container caps at a torque testing station.

A still further object of this invention is to provide improved apparatus for non-destructively testing that the release torque of container caps at a torque testing station in said apparatus is above a predetermined minimum value, and for rejecting those containers that do not pass such tests.

Yet another object of this invention is to provide improved automatic apparatus for testing for a predetermined minimum release torque of container caps, which apparatus further includes selectively operable means for destructively testing selected ones of the containers, on a sampling basis, to determine the actual release torque of the container caps thereon.

Further objects and advantages of this invention will become apparent as the following description proceeds.

SUMMARY OF THE INVENTION

Briefly stated, and in accordance with one embodiment of this invention, there is provided an apparatus for testing for a predetermined minimum release torque of container caps at a torque testing station in the apparatus. The apparatus comprises a means for delivering capped containers to the torque testing station; a means for clamping the containers at the torque testing station; a means for grasping the caps of the containers at the torque testing station; a means connected to the cap grasping means for applying a release torque to the container caps; and, a means including a strain gage coupled to the release torque applying means for sensing the level of release torque applied to the caps and providing a signal indicative of such level.

BRIEF DESCRIPTION OF THE DRAWINGS

While the specification concludes with claims particularly pointing out and distinctly claiming the subject matter of this invention, it is believed that the invention will be better understood from the following description, taken in conjunction with the accompanying drawings, in which:

Referring to FIGS. 1-5, an apparatus or torque tester for testing for a predetermined minimum release torque of container caps at a torque testing station in the apparatus has been illustrated generally at 10. The major components of the apparatus or torque tester 10 will initially be generally described herein, and then the torque tester 10 will be described in greater detail.

Figure 1:
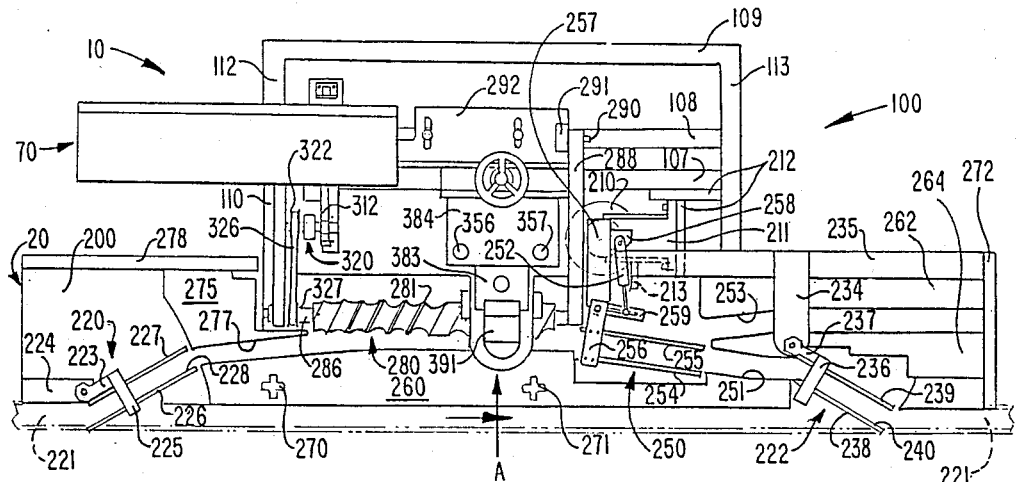
FIG. 1 is a top plan view of a torque tester made in accordance with one embodiment of this invention.

The torque tester 10 includes a conveyor means, shown generally at 20, for delivering capped containers to a torque testing station, shown generally at A, in the torque tester 10. Torque tester 10 further includes a clamping means, shown generally at 30, for clamping the containers at the torque testing station A, and a cap grasping means or collet clamp, shown generally at 40, for grasping the caps of the containers at the torque testing station A. A torque applying means, shown generally at 50 (FIG. 3), is connected to the cap grasping means 40 for applying a release torque to the container caps; and a sensing means shown generally at 60 and including a strain gage transducer 65 therein coupled to the release torque applying means 50, is provided for sensing the levels of release torque applied to the caps and providing signals indicative of such levels. A display means, shown generally at 70, is coupled to the sensing means 60 for providing readouts of the values of the release torque applied to container caps at the torque testing station A.

Figure 2:
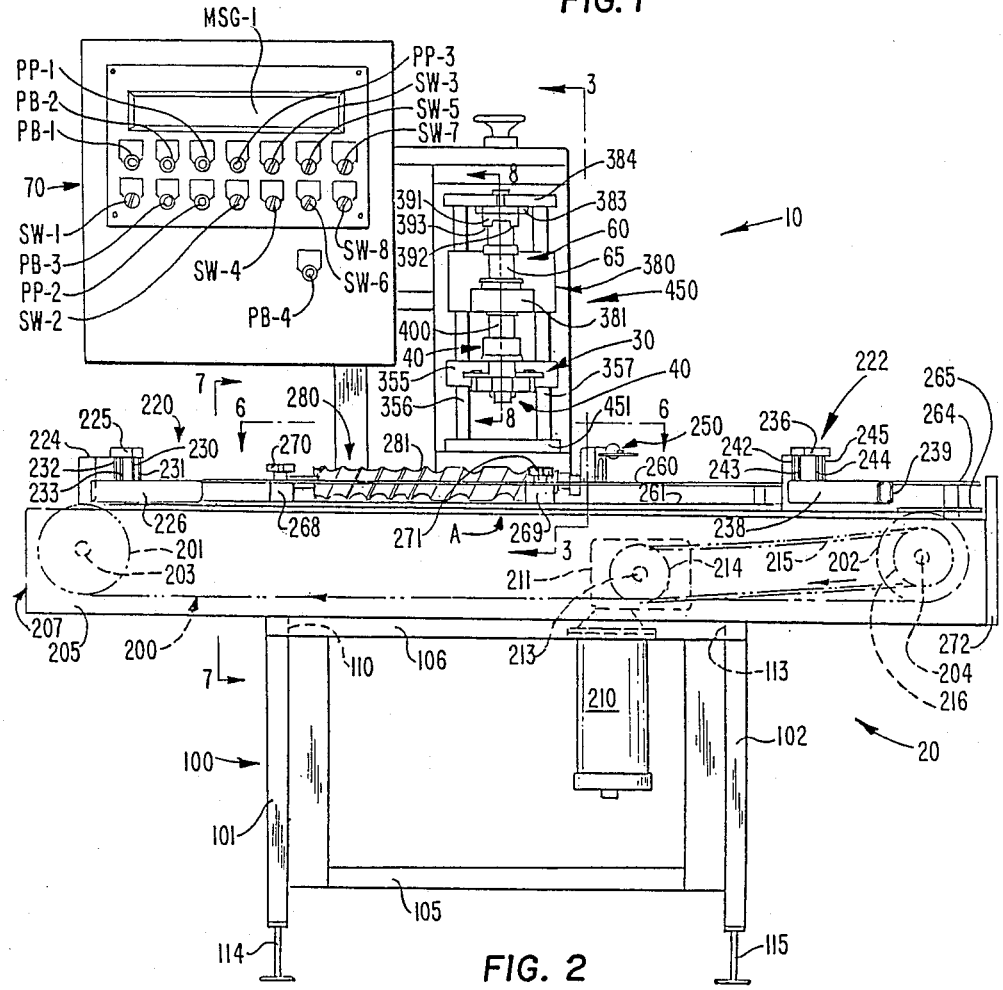
FIG. 2 is a front elevation view of the torque tester shown in FIG. 1.

Referring now more particularly to FIGS. 1, 2, 6 and 7, the apparatus 10 will now be considered in greater detail, starting with a description of the frame, shown generally at 100, of the apparatus 10. The frame 100 includes a plurality of leg members, four of which are shown at 101–104, which are interconnected by transverse braces, five of which are shown at 105–109, and longitudinal braces, four of which are shown at 110–113. The leg members 101–104 are provided at their lower extremities with adjustable foot portions, two of which are shown in FIG. 2 at 114, 115. The foot portions 114, 115 are threaded into the leg members 101, 102, and provide Vertical adjustability for the frame 100 and, thus, for the torque tester 10.

Considering the conveying means 20 now, conveying means 20 includes a continuously running conveyor belt 200 which is entrained about upstream and downstream rollers 201 and 202, respectively. The rollers 201 and 202 are carried by respective shafts 203 and 204 that, in turn, are rotatably supported at their ends in longitudinally elongate vertical leg members 205 and 206 of an inverted U-shaped frame 207 that also includes a longitudinally elongate horizontal member 208. The U-shaped frame 207 is supported atop the longitudinal braces 110 and 113 (FIG. 2) of main frame 100, and is preferably bolted thereto to allow for selective adjustment of the U-shaped frame relative to frame 100 in both the longitudinal and transverse directions.

Conveyor belt 200 is driven by means of a motor 210 and a right angle gear drive 211 which are fastened to a support 212 carried by the frame 100. Right angle gear drive 211 provides a rotary output on shaft 213. Shaft 213 carries at its end opposite right angle gear drive 211 a sprocket 214 that, in turn, is connected by a chain 215 to a sprocket 216 carried on the shaft 204 of downstream roller 202. Accordingly, the energization of motor 210 results in continuous rotation of pulley 202, and in the movement of the upper reach of conveyor belt 200 in a direction, as viewed in FIG. 2, from the upstream roller 201 to the downstream roller 202. As a result, any containers that are supported by conveyor belt 200 are moved downstream by the conveyor belt.

Referring to FIGS. 1 and 2, an infeed or diverter gate, shown generally at 220, is provided to divert containers that are moving along a conveyor belt 221, forming part of the user's production line, onto the conveyor belt 200 of apparatus 10. Similarly, an outfeed or discharge gate, shown generally at 222, is provided to discharge containers which have passed the minimum torque test back on to the production line conveyor belt 221, after the test has been completed.

Gate 220 is carried by an arm 223 that is pivotally mounted on a bracket 224 fixed to an end plate (not shown) carried by conveyor frame 207 of apparatus 10. The gate 220 includes an upper transverse arm 225 which carries first and second, transversely spaced, side rails 226 and 227 that form a channel 228 between them. The side rail 226 is supported from the transverse arm 225 by a first pair of rods 230 and 231, and the side rail 227 is supported from the transverse arm 225 by means of a second pair of rods 232, 233.

Similarly, outfeed gate 222 is pivotally mounted on an arm 234 that is carried by a bracket 235 fixed to the conveyor leg member 206 of conveyor frame 207. The gate 222 includes a transverse arm 236 which is fastened to a longitudinal arm 237 that, in turn, is pivotally supported by arm 234. The transverse arm 236, in turn, supports first and second, transversely spaced, side rails 238 and 239 that form a channel 240 between them. Rods 242 and 243 support side rail 238 from transverse arm 236, and rods 244 and 245 support side rail 239 from transverse arm 236.

The pivotal connections between gates 220 and 222 and their respective support arms 224 and 234 preferably are provided with detent mechanisms (not shown) which allow the gates to be relatively firmly held in the positions shown in FIG. 1 when the torque tester 10 is in use, yet also allows the gates to be manually diverted to second detented positions. In the second position of gate 220, the gate is parallel to and aligned with the user's production line conveyor 221, allowing containers to pass therethrough on their way downstream without being diverted onto the conveyor belt 200 of torque tester 10. In the second position of gate 222, which is a dead-ended position, the gate is positioned parallel to the user's conveyor 221 but is aligned with conveyor belt 200, rather than with the user's conveyor belt 221, so that containers moving along conveyor belt 221 are not interfered with by gate 222. The gates 220, and 222 can, of course, be provided with pneumatically actuated cylinder/piston arrangements to automate the movement of these gates into and out of their active positions vis a vis the user's production line conveyor belt 221.

A gate for diverting rejected containers within the torque tester 10 has been illustrated generally at 250. Gate 250 is normally disposed in the condition shown in FIG. 1 so that containers that pass the minimum torque test are moved by conveyor belt 200 into a channel 251 leading to discharge gate 222 and ultimately to the user's production line conveyor belt 221. When a container cap fails to pass the minimum torque test, gate 250 is pivoted by the piston rod of a pneumatically operated cylinder 252 to a position wherein it is in alignment with a channel 253 that is used to accumulate rejected containers for ultimate reprocessing or scrapping by the user. Gate 250 is generally similar in construction to the gates 220 and 222 and includes first and second, transversely spaced, side rails 254 and 255 that are suspended from a transverse arm 256 that, in turn, is pivotally supported on an arm 257 fixed to bracket 235. The pneumatic cylinder 252 is pivotally mounted at one of its ends on a block 258 that is fixed to arm 257, and the piston rod of cylinder 252 is pivotally connected to an arm 259 that is fastened to the arm 256. Accordingly, the extension of the piston rod of cylinder 252 out of the cylinder causes side rails 254 and 255 of gate 250 to move from a position in alignment with channel 253 to a position in alignment with channel 251, and the retraction of the piston rod into cylinder 252 causes gate 250 to move from a position in alignment with channel 251 to a position in alignment with channel 253.

The channels 251 and 253 at the downstream end of apparatus 10, and the dead end at the output of gate 222 when that gate is in its second detent position, are formed by various pairs of guide members, including the downstream portions of upper and lower container guide members 260 and 261, respectively, upper and lower reject guide members, the upper reject guide member of which is shown at 262, and upper and lower center divider and guide members 264 and 265, respectively. Container guide members 260, 261 are supported from the vertical leg member 205 of conveyor mechanism 20 by means of brackets, two of which are shown at 266 and 267. The lower container guide member 261 is spaced just above the upper surface of conveyor belt 200 so that the belt can run freely beneath it, and the upper container guide member 260 is spaced above the lower guide member 261 by means of spacers, two of which are shown 268 and 269. The container guides 260 and 261 are fastened to the brackets 266 and 267 by means of threaded bolts having hand turnable knobs 270 and 271 fastened thereto, the arrangement being such that the container guide members 260 and 261 can be removed and replaced upon unscrewing the knobs 270 and 271 to allow different sized container guide members 260 and 261 and different size spacers 268 and 269 to be positioned atop conveyor belt 200 in connection with altering the torque tester 10 to handle containers cf a different size.

The upper (and lower) reject guide members 262 are replaceably supported by bracket 235 and by an end bracket 272 that is fastened to the vertical leg members 205 and 206 of the inverted U-shaped frame 207. Suitable detachable bolts (not shown) fasten the reject guide members 262 to bracket 235 and to the end plate 272 in a manner allowing the guide members 262 to be replaced by different sized plates 262 in connection with changing the size of containers that are to be processed by the torque tester 10.

Similarly, the upper and lower center divider and guide members 264 and 265 are replaceably mounted in position above the conveyor belt 200 by being fastened to the end plate 272 by detachable bolts (not shown) and by being supported adjacent the upstream ends thereof from the bracket 235 by means of a U-shaped arm (not shown) that is carried by the bracket 235.

Upper and lower infeed guide members, the upper one of which is shown at 275 in FIG. 1, are provided. They cooperate with the upstream ends of upper and lower container guide members 260 and 261 to form a channel 277 for capped containers exiting from channel 228 of the the infeed gate 220 when the torque tester 10 is in operation. The upper and lower infeed guide members 275 are detachably bolted to and supported by a bracket 278 carried by frame 100 so that they can be replaced with change parts in order to accommodate different sized capped containers in the torque tester 10.

Referring to FIGS. 1, 2, 6 and 7, the torque tester 10 is provided with a feed screw mechanism, shown generally at 280, which receives capped containers that are moving through channel 277 under the urging of conveyor belt 200 and sequentially spaces apart the capped containers while feeding them in discreet steps to the torque testing station A.

Figure 6:
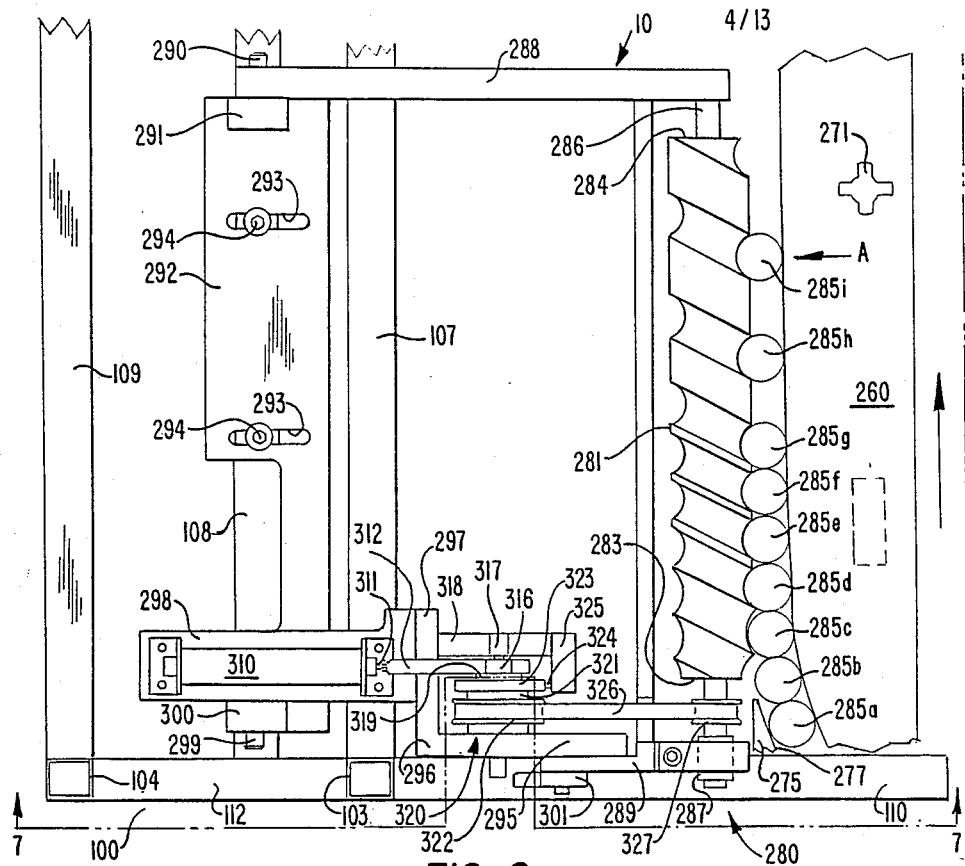
FIG. 6 is an enlarged plan view, taken along the line 6—6 of FIG. 2 and with parts omitted for clarity, of a feed screw mechanism employed in the torque tester for feeding capped containers to a torque testing station therein.

As shown most clearly in FIG. 6, the feed screw mechanism 280 includes a threaded feed screw member 281 the pitch of which increases in a number of steps from the upstream end 283 thereof to the downstream end 284 thereof. Accordingly, capped containers, such as those shown at 285a–285i, initially move through channel 277 into contact with the upstream end 283 of feed screw 281 in abutment with another, as shown at 285a–285c. However, they are eventually separated from one another as they move by the feed screw 281 through the space between the feed screw and the container guide 260, initially reaching the spacing shown between container 285g and container 285h, and then reaching the spacing shown between container 285h and container 285i. Each revolution of feed screw 281 results in the movement of a given container, for example container 285c in FIG. 6, a distance downstream to the position of the next downstream container, in the example given the position occupied by container 285d. Thus, after 8 revolutions of feed screw 281, the container shown at container position 285a would arrive at the container position shown at 285i, which position is the position of the torque testing station A. Between revolutions of the feed screw 281, the screw remains stationary while the torque tester 10 performs a torque testing operation on the container 285i at the torque testing station A.

The feed screw 281 is supported on and rotatable with a shaft 286 that is rotatably supported at its ends in bearings one of which is shown at 287, carried by transversely spaced arms 288 and 289. Arm 288 is pivotally mounted at 290 on a bracket 291 carried on a slide plate 292 that is adjustably mounted, via slots 293 and bolts 294, on transverse brace 108 of frame 100.

Arm 289 is fixedly mounted upon one leg 295 of an L-shaped bracket 296, the other leg 297 of which is fixedly carried by a support plate 298. The support plate 298, in turn, is pivotally mounted at 299 in a block 300 that is fixedly carried by the slide plate 292. Accordingly, the feed screw 281 may be moved toward and away from the upper and lower container guide members 260 and 261 by adjustment of the slide plate 292 relative to its underlying support brace 108. In addition, since arm 288 and the assembly comprising arm 289, bracket 296 and support plate 298 are pivotally mounted at 290 and 299, respectively, on the slide plate 292, the vertical elevation of feed screw 281 can be changed to accommodate containers of different heights.

The vertical elevation of feed screw 281 is adjusted by means of a lever 301 having one of its ends pivotally mounted at 302 to arm 289. The other end of lever 301 is provided with a slot 303 through which the lever 301 is adjustably bolted to a bracket 304 by means of a lock bolt 305 that passes through the slot 303 and threadedly engages the bracket 304. Bracket 304, in turn, is fixedly mounted on the longitudinal brace 110 of frame 100.

Feed screw 281 is intermittently rotated one full turn to advance the containers 285a-285i therealong by means of a pneumatically actuated power cylinder 310, the piston rod 311 of which is connected to a rack gear 312. The rack gear 312 is provided with downwardly extending teeth 313 which engage with the teeth of a pinion gear 314 carried on a shaft 315. Rack gear 312 is held in meshing contact with pinion gear 314 by means of a roller 316 that is rotatably supported in a bracket 317 carried on an arm 318 that is fixed to the leg 297 of L-shaped bracket 296. Thus, extension and retraction of piston rod 311 out of and back into the cylinder 310 causes the rack gear 312 to alternately rotate the pinion gear 314 in one direction and then another.

One end of the shaft 315 of pinion gear 314 is rotatably supported in arm 318 by means of a bearing (not shown). The other end of shaft 315 is connected to one rotary member 319 of an over-running clutch, shown generally at 320, the other rotary member 321 of which carries a drive pulley 322 about its outer periphery. Rotary member 321 of over-running clutch 320 also carries a detent ring 323 about its outer periphery. The ring 323 is provided with detent depressions (not shown) at two 180° spaced-apart locations thereon. A plunger 324 carried by an arm 325 fixed to arm 318 cooperates with the detent depressions of detent ring 323 in retaining the second rotary member 321 of over-running clutch 320 in one or another of the two 180° spaced-apart detent locations of detent ring 323.

Figure 7:
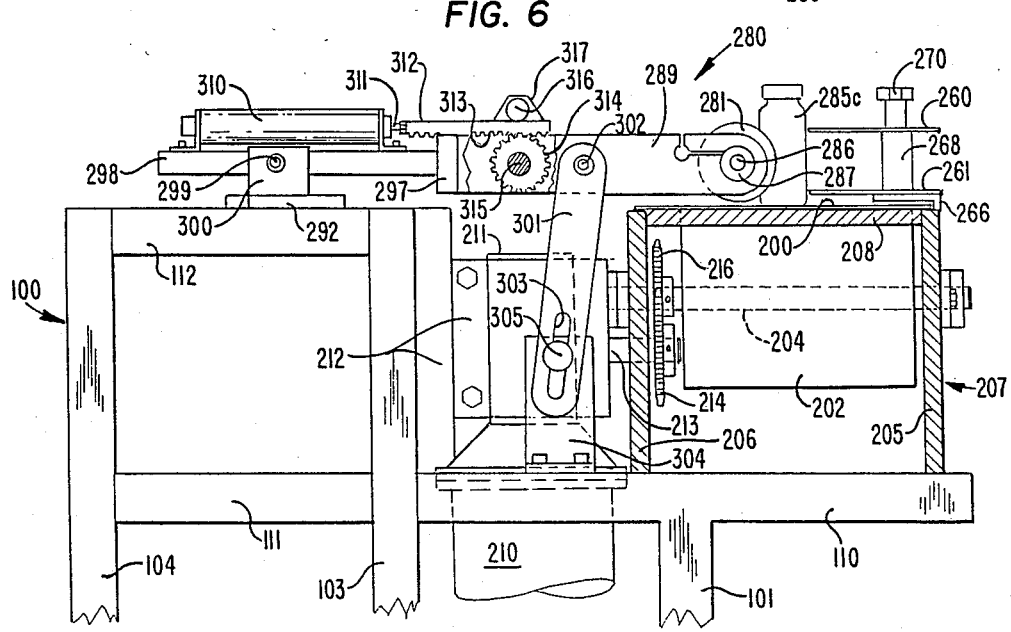
FIG. 7 is an enlarged elevation view, taken along the line 7—7 of FIG. 2 and with parts omitted for clarity, showing portions of the feed screw mechanism.

The over-running clutch 320 is so constructed and arranged that when the piston rod 311 is in the process of extending from power cylinder 310, causing pinion gear 314 to rotate clockwise as viewed in FIG. 7, the two rotary members 319 and 321 of over-running clutch 320 are locked together and rotate the drive pulley 322. Accordingly, drive pulley 322 rotates a toothed belt 326 which is entrained about a driven pulley 327 that is keyed to the shaft 286 of feed screw 281. Consequently, the feed screw 281 rotates during the outward stroke of piston 311 from power cylinder 310. The pulleys 322 and 326 are in a ratio of two to one, and the stroke of piston rod 311 causes the pinion 314 and pulley 322 to rotate one-half of a turn during the outstroke of the piston rod. Feed screw 281, in turn, rotates one full turn, causing each of the containers 285a-285i to move to the positions occupied by the next higher lettered container along the feed screw.

During the return stroke of piston rod 311 into the power cylinder 310, the over-running clutch 320 prevents the second rotary member 321 thereof from rotating with the first rotating member 319 thereof. Accordingly, the detent plunger 324 holds the detent ring 323 and drive pulley 322 in a fixed position during the return stroke of the piston rod 311. In this manner the containers 285a-285i are progressively moved in step by step increments along the length of feed screw 281, from a position upstream of the feed screw to and through the torque testing station A and into the discharge gate 250 (FIG. 1) for ultimate return to the user's production line conveyor belt 221 or for diversion into the channel 253 for defectively capped containers.

Referring now to FIGS. 1-3 and 5, the clamping means 30 for clamping the capped containers at torque testing station A will now be considered in greater detail. Clamping means 30 includes a pair of clamping arms 350, 351 which are movable between a closed or clamping position, shown in solid lines in FIG. 5, and an open or unclamping position, shown in broken lines in FIG. 5. The arms 350, 351 are adapted to engage the shoulder of a capped container (e.g., the capped container 285i shown in FIGS. 3 and 5) when the container is at the torque testing station A. Clamping arms 350, 351 are each fixedly mounted upon one end of respective swingable arms 352, 353. The other end of each of the swingable arms 352, 353 is pivotally connected at 349 to a bracket 354 that is fixed to the undersurface of a slide 355. Slide 355 is clamped between a pair of spaced apart vertical rods 356, 357. The slide 355 is vertically movable on rods 356 and 357 by releasing a pair of lock knobs 358, 359 which clamp the slide 355 to the rods 356, 357. This allows the clamping arms 350 and 351 of the slide to be vertically aligned with the shoulders of different sized containers to be tested.

A pneumatically actuated power cylinder 360 which extends and retracts a piston rod 361 therefrom is employed to move the clamping arm 350, 351 between their clamping and unclamping positions. The end of piston rod 361 remote from cylinder 360 is bolted to an L-shaped slide member 362 the lower leg 363 of which is provided with a pair of slots 364, 365 which engage with pins or cam followers 366, 367 that are fixedly carried by the respective arms 352, 353. In addition, the L-shaped slide member 362 has fixedly attached thereto a pair of rearwardly projecting guide members 368, 369 which pass through corresponding aligned apertures 370, 371 in slide member 355 to guide the slide 362 during its movement when pneumatic cylinder 360 is actuated to extend and retract piston rod 361 relative to the cylinder.

Figure 5:
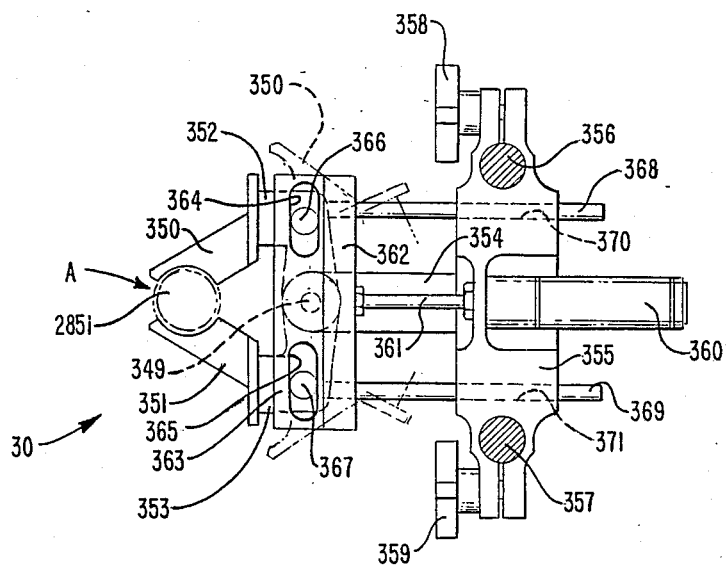
FIG. 5 is a sectional plan view, taken along the line 5—5 of FIG. 3.

As illustrated in FIG. 5, the piston rod 361 is in an extended position relative to cylinder 360. When piston rod 361 is retracted into cylinder 360, slide member 362 is moved to the right, causing cam followers 366, 367 to move to the right with the slide member 362. Accordingly, the arms 352, 353 pivot with respect to their common pivot 349, moving the clamping arms 350, 351 to the broken line positions shown in FIG. 5. During this movement, the guide rods 368, 369 move to the right in their respective apertures 370, 371.

Similarly, when piston rod 361 is extended from cylinder 360, the slide member 362 moves to the left as viewed in FIG. 5, with the guide rods 368, 369 also moving to the left within their apertures 370 and 371. Accordingly, the clamping arms 350, 351 move from the broken line position shown in FIG. 5 to the full line position shown in FIG. 5, clamping the capped container 285i located at the torque testing station A.

Referring now to FIGS. 1–4 and 8, the cap grasping means 40, the torque applying means 50 and the sensing means 60 will now be considered in greater detail. The various means 40, 50 and 60 are supported on a slide plate, shown generally at 380, which is mounted on and vertically movable relative to the vertical rods 356 and 357. The slide plate 380 has a horizontal arm 381 fixed thereto which is continuously urged upwardly, as viewed in FIG. 3, by a tension spring 382 which is interconnected between the arm 381 and a bracket 383 carried by an arm 384 that supports the upper ends of the vertical rods 356 and 357. Slide plate 380 is moved downwardly against the force of tension spring 382 by a pneumatically actuated power cylinder 385 that is carried by the arm 384. The power cylinder 385 controls a piston rod 386 that has its end thereof remote from the power cylinder 385 attached to a block 387 that is fastened to the slide plate 380. Accordingly, when power cylinder 385 is actuated, piston rod 386 extends outwardly of the power cylinder, moving the slide plate 380 downwardly to its lower position shown in FIG. 3, against the tension of spring member 382. Conversely, when the power cylinder is deactuated, spring 382 raises the slide plate 380 to its upper position.

When the slide plate 380 is in its upper position, a cap plate 388, which is carried atop the sensing means 60 and has a a pair of spaced slots 389, 390 (FIG. 4) therein, abuts against the lower end of a downwardly extending, L-shaped arm 391. Arm 391 is provided with a pair of downwardly extending, spaced lugs 392, 393 that engage the spaced slot 389, 390 of stop plate 388. The L-shaped arm 391 is fastened to a block 394 that is pivotally supported at 395 from bracket 383. A bolt 396, which passes through a slot in bracket 383 and threadedly engages L-shaped arm 391, captures a spring 396a between its bolt head and bracket 383 and establishes the vertical elevation of the lugs 392, 393 at the end of arm 391. The pivot action of arm 391 about pivot pin 395 is incorporated to allow for possible misengagement of cap plate 388 with lugs 392 and 393. In this event the arm 391 will lift above the initial position dictated by the action of compression spring 396a. The cap plate 388 is bolted to the top of the strain gage transducer 65 by means of a plurality of bolts 397. The arm 391, when engaged by the cap plate 388, serves as a positive stop against rotation of cap plate 388. This is used in connection with establishing known torque levels for the torque applying means 50, as will appear in greater detail hereinafter. The upper and lower positions of slide plate 380 are established by the abutment of the piston (not shown) within cylinder 385 against the upper and lower ends of the cylinder, respectively. When the slide plate 380 is moved to its lower position by pneumatically actuated power cylinder 385, the lower end of the cap grasping means 40 encircles a cap 398i carried by the container 285i at the torque testing station A, as shown in FIG. 3.

Figure 3:
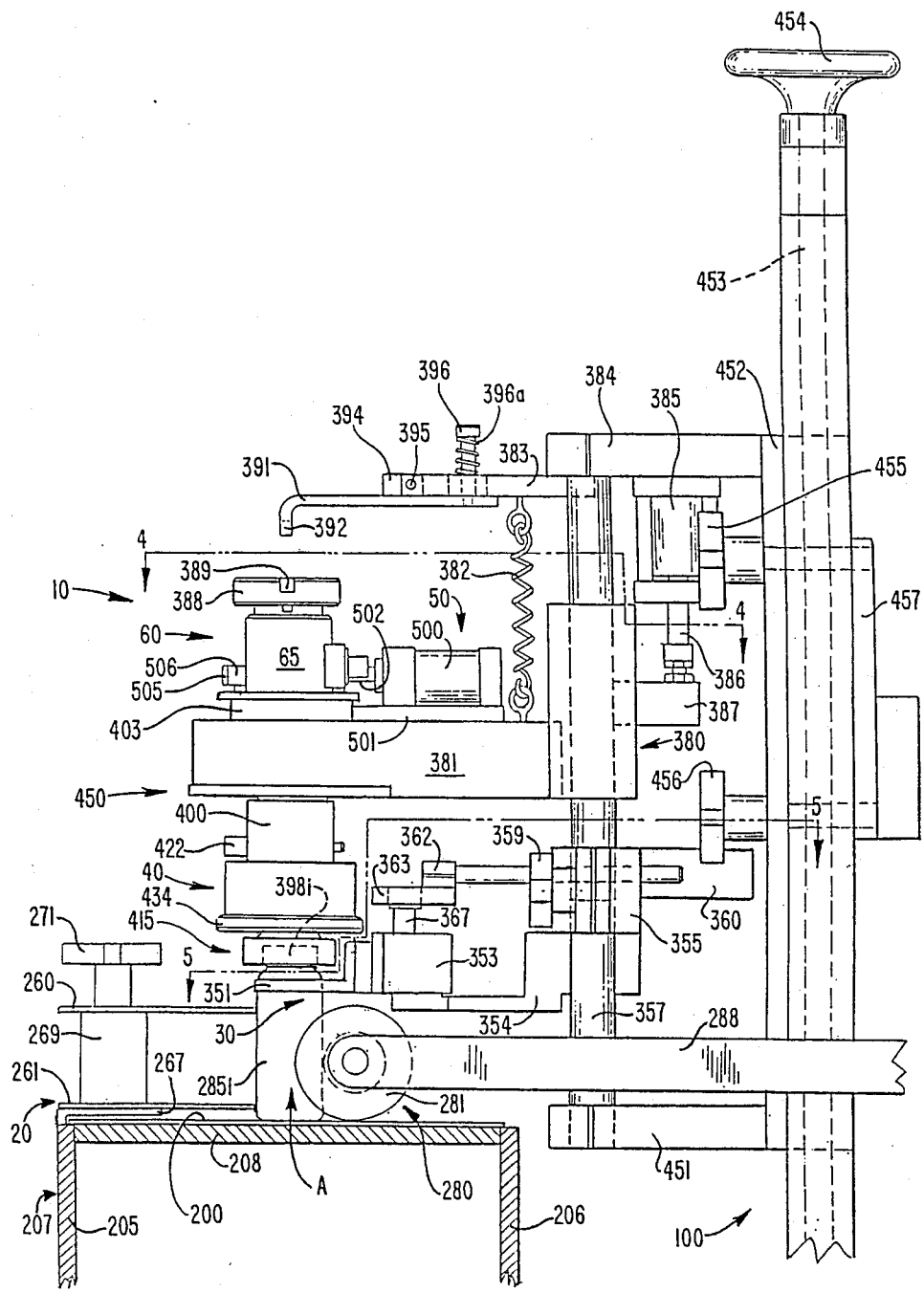
FIG. 3 is an enlarged elevation view, with parts cut away for clarity, taken along the line 3—3 of FIG. 2.
Figure 8:
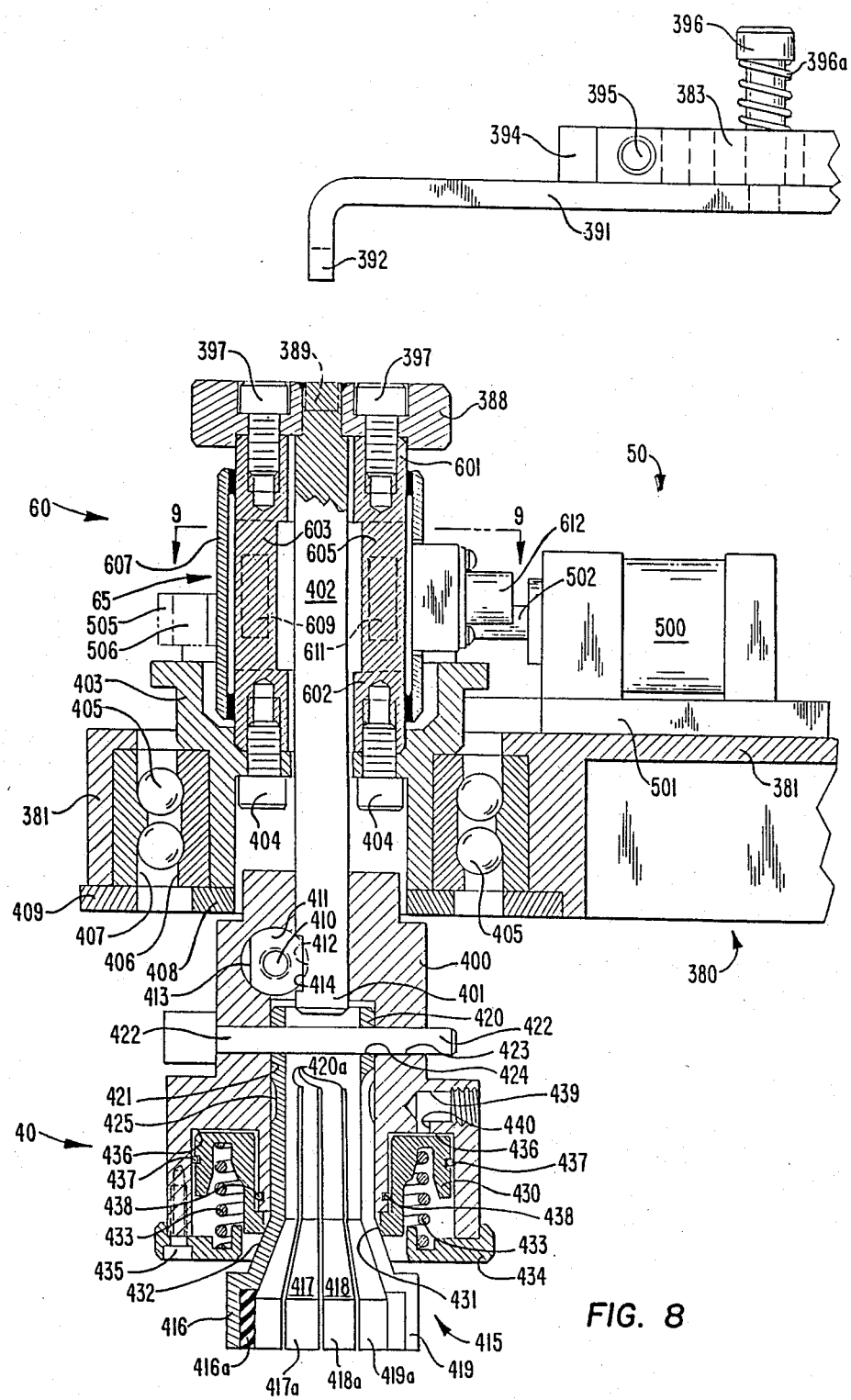
FIG. 8 is an enlarged elevation view, taken along the line 8—8 of FIG. 2.

As shown most clearly in FIGS. 3 and 8, the cap grasping means 40, which serves to grasp the caps of containers located at the torque testing station A, includes a housing 400 that is keyed to and suspended from the lower portion 401 of a rod 402. Rod 402 is welded to cap plate 388 and extends from the lower surface of the cap plate, passing through the interior of the strain gage transducer 65 of sensing means 60. The cap plate 388 is bolted to the top of strain gage transducer 65 and the strain gage transducer 65, in turn, is supported by and bolted to a housing 403 by means of bolts 404. Housing 403 is rotatably supported in arm 381 of slide plate 380 by means of a bearing 405 having inner and outer races 406, 407. Races 406 and 407 are held in place against shoulders formed in housing 403 and arm 381 by respective inner and outer bearing caps 408 and 409.

The housing 400 is locked to the lower portion 401 of rod 402 by means of a lock pin 410 having a disc 411 thereon which engage a slotted portion 412 in the rod 402 to lock the housing 400 to the rod. Disc 411 has a portion of its surface cut away at 413, and shaft 402 has a corresponding portion of its surface cut away at 414 to allow the housing 400 to be removed from the shaft 402 when key 410 is rotated so that its cut away portion 413 is in alignment with the cut away portion 414 of rod 402. This arrangement provides for quick release of the housing 400 from the shaft 402 in connection with changeovers in the size of containers that are to be tested by the apparatus 10.

Housing 400 carries a chuck, shown generally at 415, which is adapted to engage and grasp the caps of containers that arrive at the torque testing station A. Chuck 415 includes a plurality of finger portions 416–419 which extend downwardly from a common cylindrical upper portion 420 of the chuck. The inner, lower portions of the fingers 416–419 are coated with an elastomeric material (e.g., rubber) as shown at 416a–419a in FIG. 8. The fingers 416–419 are separated from one another through a major portion of their lengths by grooves 420a.

Chuck 415 is held in a cylindrical opening 421 formed in housing 400 by means of a quick release pin 422 that passes through aligned openings 423 and 424 formed in the housing 400 and in the upper portion 420 of the chuck 415, respectively.

The upper portions of the fingers 416–419 have reduced thickness cross-sections therein formed by grooves 425 cut therein so that the lower portions of the fingers can be flexed inwardly in connection with grasping the caps of containers at the torque testing station A. Fingers 416–419 are flexed inwardly by the downward movement of a collet ring 430 which is provided with a camming surface 431 thereon that engages a conical surface 432 formed by, and about, the outer intermediate portions of the fingers 416–419. Accordingly, when collet ring 430 is moved downwardly, it cams the various fingers 416–419 inwardly into cap grasping engagement with the container caps at the torque testing station A. The fingers 416–419 tend to remain in the position shown in FIGS. 8 by natural spring resilience when they are not being cammed into a cap grasping condition by collet ring 430. Collet ring 430 is held in its upper, non-camming position by means of a compression spring 433 which is held in position within housing 400 by a spring seat 434 that is bolted to the housing 400 via bolts 435.

The collet ring 430 is mounted in a chamber 436 formed in housing 400 and forms an annular piston that is vertically reciprocable in chamber 436. O-rings 437 and 438 are provided on the outer and inner walls, respectively, of collet ring 430 to seal the piston-like collet ring with respect to the chamber 436. Compressed air may be introduced into the chamber 436 via a conduit 439, 440 formed in housing 400. Accordingly, when compressed air is introduced to chamber 436, collet ring 430 moves downwardly against compression spring 433, and its camming surface 431 engages conical surface 432, moving the fingers 416–419 into cap-grasping engagement with the cap of a container at the torque testing station A. Conversely, when the pressure is released in chamber 436, spring 433 moves the collet ring 430 upwardly in chamber 436, allowing the fingers to spring back to their outer positions and releasing the grasp of the fingers on the container cap.

The clamping means 40, sensing means 60 and other elements associated therewith that are rotatably supported by bearing 405 on the arm 381 of slide 380 are hereinafter alternately referred to, collectively, as the torque tester head 450. Torque tester head 450, and the clamping means 30 which cooperates with it, may be moved vertically as a unit by vertically moving the vertical rods 356 and 357 and the arm 384 which support them. Rods 356 and 357, which are carried at their upper ends by arm 384, are supported at their lower ends by another arm 451. Arms 451 and 384 are rigidly fastened to a slide plate 452 that threadedly engages a lead screw 453 rotatably mounted in frame 100 of the apparatus. Lead screw 453 may be rotated by a handwheel 454 which is keyed to the upper end of the lead screw 453. Accordingly, rotation of handwheel 454 in one direction moves slide plate 452 upwardly relative to lead screw 453, and rotation of handwheel 454 in an opposite direction move slide plate 452 downwardly relative thereto. The vertical movement of slide plate 452, in turn, results in vertical movement of arms 384 and 451 and the rods 356 and 357 fastened thereto, resulting in vertical movement of the torque tester head 450 and the clamping means 30. This adjustment is used to adjust the torque tester for use with containers of different heights. A group of hand-operated lock-bolts, two of which are shown at 455 and 456, threadedly engage a back plate 457 to clamp the slide plate 452 into position against frame 100 when the slide plate has been adjusted to a desired elevation.

Figure 4:
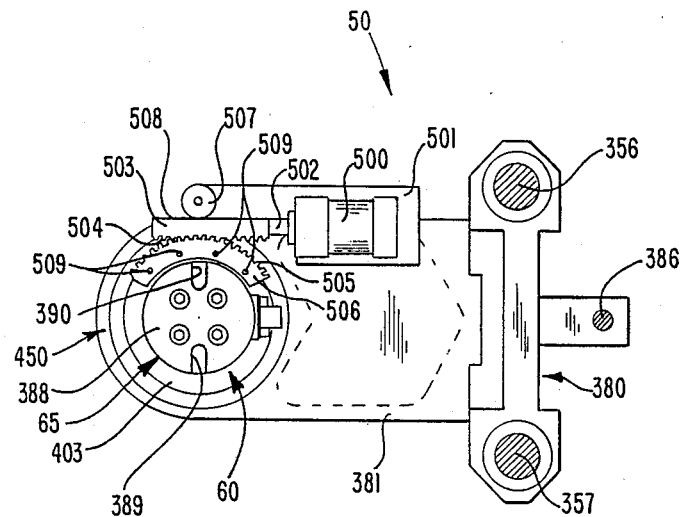
FIG. 4 is a sectional plan view, taken along the line 4—4 of FIG. 3.

Referring to FIGS. 3, 4 and 8, the torque applying means 50, which is connected to the cap grasping means 40 and serves to apply a release torque to the container caps at the torque testing station A, will now be considered in greater detail. The torque applying means 50 includes a pneumatically actuated power cylinder 500 that is fixed to a mounting plate 501 that, in turn, is fastened to the arm 381 of slide 380. The power cylinder 500 extends and retracts a piston rod 502. Piston rod 502 carries at its end remote from cylinder 500 a rack gear 503 having teeth 504 thereon which engage with the teeth 505 of a sector gear 506 that is fastened by bolts 509 to the top of the housing 403 which supports the lower end of the strain gage transducer 65 of sensing means 60. The teeth 504 of rack gear 503 are held in meshing engagement with the teeth 505 of sector gear 506 when the piston rod 502 is extended and retracted from power cylinder 500 by means of a roller 507 that bears against a back surface 508 of the rack gear 503. Roller 507 is rotatably mounted on the mounting plate 501 which supports the power cylinder 500.

As viewed in FIG. 4, when air pressure is applied to power cylinder 500 in a direction to extend piston rod 502 outwardly from power cylinder 500, the torque tester head 450 tends to move counter-clockwise relative to arm 381. This in turn, tends to rotate a container cap of a container clamped at the torque testing station in a direction to release the cap from the container and, depending upon the air pressure applied to power cylinder 500 and the tightness with which the cap was torqued up on the container, the cap will either be released from the container or not. It will thus be seen that by precisely controlling the amount of air pressure applied to the pneumatically actuated power cylinder 500 in a direction to extend the piston rod 502 therefrom, the amount of release torque applied to a closed, capped container at the torque testing station A can be precisely controlled. The manner in which this control is achieved and utilized will be discussed in greater detail hereinafter.

Figure 9:
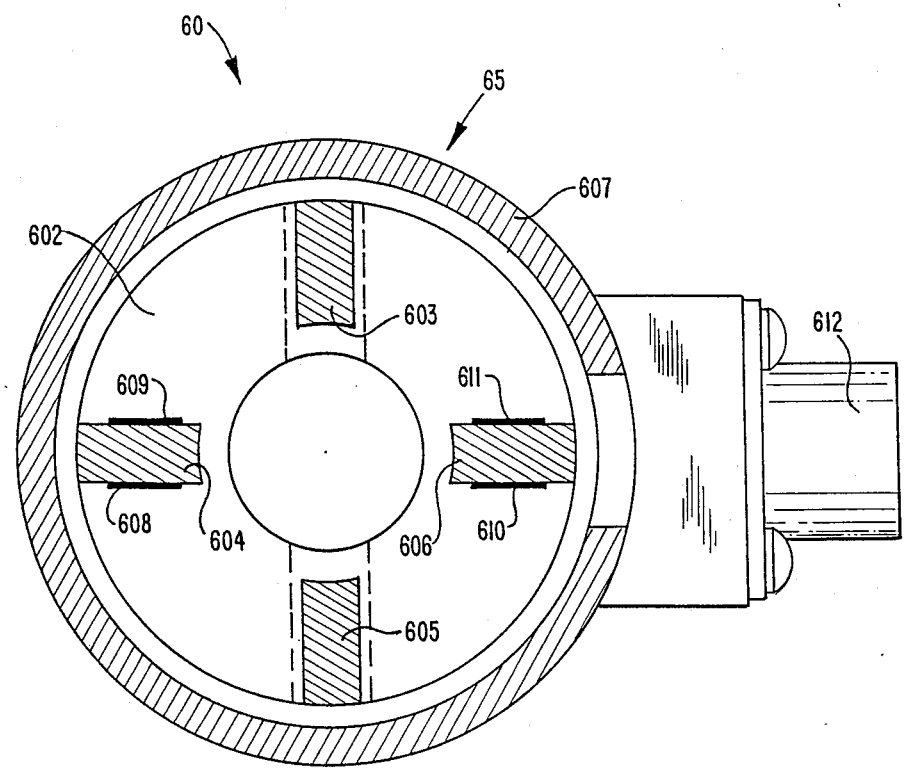
FIG. 9 is a sectional plan view, taken along the line 9—9 of FIG. 8.

Referring now to FIGS. 8 and 9, the sensing means 60, which is coupled to the release torque applying means 50 and serves to sense the level of release torque applied to the caps and to provide a signal indicative of such levels, will now be considered in greater detail.

The strain gage transducer 65 of sensing means 60 includes upper and lower annular members 601 and 602, respectively, which are interconnected by four circumferentially spaced, vertically extending, leg members 603, 604, 605 and 606. The leg members 603–606 are angularly spaced apart 90° from one another and are surrounded by an outer cylindrical housing 607 which is sealed at its upper and lower ends to the respective upper and lower annular members 601 and 602.

Four strain gage pads 608, 609, 610 and 611 are carried within the strain gage transducer 65. Strain gage pads 608 and 609 are adhered to opposite sides of leg member 604, and strain gage pads 610 and 611 are adhered to opposite sides of leg member 606. The leg members 603–606 are rectangular in cross section and capable of flexing throughout their lengths when a torque is applied to one of the annular members 601 or 602 and the other of the annular members is connected to a torque resisting article.

The strain gage pads 608–611 are electrically interconnected in a bridge arrangement, to be discussed hereinafter, and the wires to and from the bridge arrangement are brought out to a four pin cable connector 612 that is fastened to the outer housing 607 of the strain gage transducer 65. A suitable plug and cable (not shown) are employed to connect the strain gage bridge arrangement to the remaining electrical circuits of the apparatus, in a manner to be described hereinafter.

The lower annular member 602 is bolted to the previously described housing 403 by the bolts 404 and the upper annular member 601 is bolted to the cap plate 388 by the bolts 397, as previously described. Accordingly, when power cylinder 500 of torque applying means 50 is actuated to extend piston rod 502 therefrom, a torque is applied to housing 403 which, in turn, applies the torque to the lower annular member 601. This torque is thus applied through legs 603–606, upper annular member 601, cap 388 and shaft 402, to the chuck 415 that is grasping the cap on the container at the torque testing station A. Assuming the amount of torque applied is insufficient to release the cap from its container, the legs 603–606 flex, causing an electrical signal to be outputted from the strain gage bridge arrangement formed by strain gage pads 608–611, which signal is fed to the electrical circuits of the apparatus.

The strain gage transducer 65 is preferably a Model 1122-100 reaction torque sensor made by GSE Inc. of 23640 Research Drive, Farmington Hills, Mich. 48024-1090. The Model 1122-100 reaction torque sensor has a rated capacity of 100 lb. inches and an output signal at rated capacity of 2 millivolts per volt nominal, with a maximum DC or AC root-mean-square excitation of 20 volts. Its bridge resistance is 350 ohms.

Figure 10:
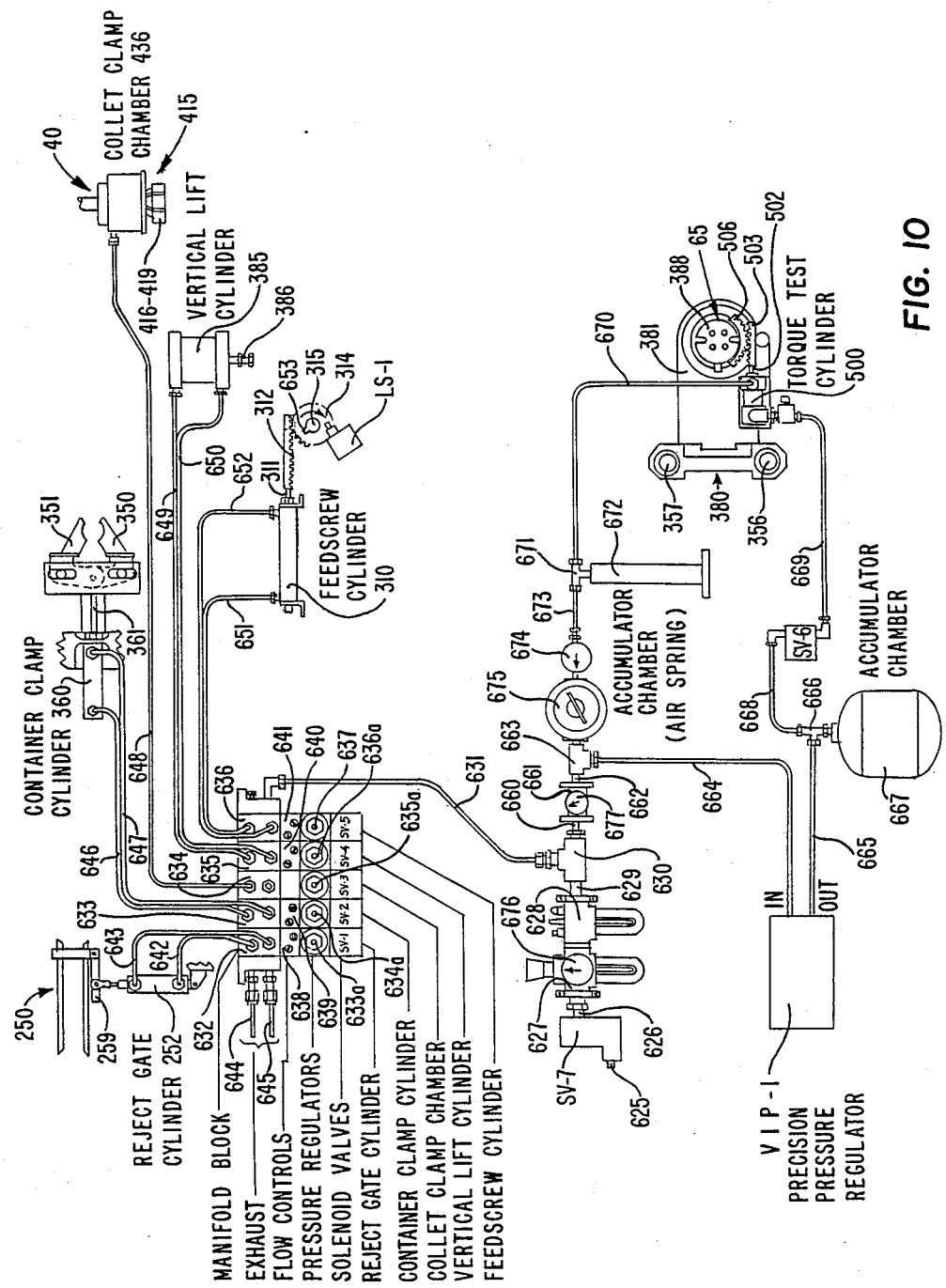
FIG. 10 is a synoptic diagram of the pneumatic circuits employed in the operation of the apparatus shown in FIGS. 1 and 2.

Referring now to FIG. 10, a pneumatic system, shown generally at 620, that may be employed in controlling the torque tester 10 has there been illustrated. High pressure compressed air, for example at 80 lbs. per square inch pressure, is led from a compressor source (not shown) via a conduit 625 to a solenoid valve SV-7 which, when energized, directs the air through a conduit 626 to a regulating valve 627 that reduces the pressure thereof to about 50 lbs. per square inch for use in the pneumatic system 620. The 50 lbs. per square inch compressed air is fed through a lubricator 628 and conduit 629 to a tee union 630, the upper outlet of which is connected to a conduit 631 that feeds the 50 lbs. per square inch compressed air to the manifold blocks 632–636 of a group of respective solenoid valves SV-1, SV-2, SV-3, SV-4 and SV-5.

The solenoid valves SV-1 to SV-5 are single solenoid, pilot-operated, plug-in type directional air valves, for example model No. NVSP 4116-0007-F, made by SMC Pneumatics Inc. of 3011 N. Franklin Road, P.O. Box 26640, Indianapolis, Ind. 46226. These valves employ single solenoids to actuate the pilots thereof, and the pilots are returned by means of a spring when the solenoid is deactuated. Respective pressure regulators 633a, 634a, 635a, 636a and 637 are provided on the valves SV-1 through SV-5 to allow for individual adjustment of the pressures employed in connection with the equipment operated by the solenoid valves, and flow controls 638 and 639 are provided on valves SV-1 and SV-2, respectively, and flow controls 640 and 641 are provided on respective solenoid valves SV-4 and SV-5, to regulate the rate of flow of compressed air through these valves.

Solenoid valve SV-1 is connected via conduits 642 and 643 to respective opposite ends of reject gate cylinder 252 so that when solenoid valve SV-1 is energized, high pressure air flows from conduit 631 through the high pressure side of manifold block 636 and solenoid valve SV-1 to conduit 642 and the end of reject gate cylinder 252 opposite to the piston rod end thereof. Accordingly, the piston rod of cylinder 252 extends from the cylinder and reject gate 250 moves to its position in alignment with channel 251 (FIG. 1), which leads containers that have satisfactorily passed the minimum torque test to discharge gate 222 and back to the user's conveyor 221. Conduit 643 (FIG. 10) which is connected to the end of power cylinder 252 adjacent to the piston rod of this cylinder is at this time being exhausted to atmosphere via the exhaust side of manifold 632 and exhaust lines 644 and 645. A catch basin (not shown) is provided at the down stream ends of exhaust lines 644 and 645 to collect any lubricating oil that may be discharged with the exhaust air from the various solenoid valves. When solenoid valve SV-1 is de-energized, the internal connections of the valve reverse. Accordingly, high pressure air is led to the side of cylinder 252 adjacent its piston rod and the other end of the cylinder is connected to atmosphere, causing the piston rod to be retracted into the cylinder, and aligning gate 250 with reject channel 253 (FIG. 1).

Solenoid valve SV-2 (FIG. 10) is connected via conduits 646 and 647 to opposite ends of container clamp cylinder 360 and, when solenoid valve SV-2 is energized, high pressure air is delivered by conduit 646 to the end of container clamp cylinder 360 remote from piston rod 361 to extend the piston rod from the cylinder and move clamps 350 and 351 into clamping engagement with the container that is at the torque testing station A. At the same time, the opposite end of container clamp cylinder 360 is evacuated to atmosphere by conduit 647, the low pressure side of manifold block 633 and exhaust lines 644 and 645. When solenoid valve SV-2 is de-energized, the internal connections of the valve reverse and piston rod 361 is retracted into cylinder 60, unclamping the container at the torque testing station.

Solenoid valve SV-3, when energized, delivers high pressure air via conduit 648 to the chamber 436 (FIG. 8) of collet clamp or cap grasping means 40. Accordingly, the fingers 416–419 of chuck 415 move radially inwardly to grasp the cap of the container at the torque testing station. When solenoid valve SV-3 is de-energized, conduit 648 (and chamber 436) are evacuated to atmosphere through the low pressure side of manifold 634 and exhaust lines 644 and 645.

Solenoid valve SV-4 controls the movement of vertical lift cylinder 385, which raises and lowers the torque tester head 450 (FIG. 2). When solenoid valve SV-4 (FIG. 10) is energized, high pressure air is directed by a conduit 649 to the end of vertical lift cylinder 385 remote from its piston rod 386, and the side of cylinder 385 adjacent to the piston rod is evacuated to atmosphere via a conduit 650. This lowers the torque tester head 450 so that the fingers 416–419 of chuck 415 surround the cap of the container at the torque testing station A. When solenoid valve SV-4 is de-energized, the pilot thereof is returned under spring action to its deactuated condition and conduit 649 is connected to atmosphere while conduit 650 is pressurized by high pressure air. Accordingly, the piston rod 386 of vertical lift cylinder 385, is retracted into cylinder 385 raising the torque tester head 450 to a position in which the chuck 415 is clear of the container cap at the torque testing station A.

Solenoid valve SV-5 is connected via conduits 651 and 652 to opposite ends of feed screw cylinder 310. When solenoid valve SV-5 is energized, high pressure air is fed via conduit 651 to the end of feed screw cylinder 310 remote from piston rod 311, causing the piston rod to move out of the cylinder and rotating gear 314 clockwise, as viewed in FIG. 10. The shaft 315 of gear 314 carries a cam 653 thereon which engages and actuates a limit switch LS-1 when the piston rod 311 is fully extended from cylinder 310. As will appear in greater detail hereinafter, this causes the solenoid valve SV-5 to become de-energized, causing conduit 651 to be connected to atmosphere and conduit 652 to be pressurized. Accordingly, the piston rod 311 is then retracted into feed screw cylinder 310, rotating the gear 314 counterclockwise. As hereinbefore described, the outward movement of piston rod 311 from cylinder 310 causes rotation of feed screw 281 which, in turn, moves a capped container that already has been tested out of the torque testing station A, and moves a new capped container that has yet to be tested into the torque testing station A. The return stroke of piston rod 311 into cylinder 310 is without incident since the overrunning clutch 320 (FIG. 6) prevents the retracting movement of piston rod 311 from effecting a corresponding movement of feed screw 281.

As may be seen in FIG. 10, the tee union 630 includes a second outlet which is connected to a conduit 660 that feeds the 50 lbs. per square inch compressed air exiting from tee union 630 to another regulating valve 661. Regulating valve 661 further reduces the 50 lbs. per square inch compressed air to a 30 lbs. per square inch level and directs this air through a conduit 662 to the inlet of a second tee union 663. One outlet of tee union 633 is connected to a conduit 664 that delivers 30 lbs. per square inch compressed air to a precision pressure regulator VIP-1. The precision pressure regulator VIP-1 receives a 0–5 v DC analog voltage input from a central processing unit (CPU), in a manner to be described in greater detail hereinafter, and provides a corresponding output air pressure which varies from 0 to 30 lbs. per square inch in accordance with a predetermined format. Voltage inputs to the precision pressure regulating valve VIP-1 of 0 to 1 volt result in a 0 to about 6 lbs. per square inch pressure output of the valve, and voltage inputs to valve VIP-1 of from 1 volt to 5 volts result in corresponding linear increases of output air pressure from about 6 psi to 30 psi.

The output air pressure from precision pressure regulator VIP-1 is transmitted via a conduit 665 to a tee union 666 one outlet of which is connected to a accumulator chamber 667 and the other outlet of which is connected to a conduit 668. Accumulator chamber 667 serves to smooth out the variations in output pressure that occur from precision pressure regulator VIP-1 so that pressure changes initiated by the precision pressure regulator VIP-1 are smoothly transitioned to the torque test cylinder 500 over a number of cycles of the torque tester 10. The air pressure stored in accumulator 667 is led by conduit 668 to a solenoid valve SV-6 which, when energized, connects the conduit 668 to a conduit 669 that leads to the end of torque test cylinder 500 remote from the piston rod 502 thereof. Accordingly, when solenoid valve SV-6 is energized, the compressed air in accumulator chamber 667 is directed to the end of power cylinder 500 remote from the piston rod 502, tending to move the piston rod out of the cylinder.

At the same time, the end of cylinder 500 nearest to piston rod 502 is connected via a conduit 670 to the inlet of a tee union 671, one of whose outlets is connected to an accumulator chamber 672 that serves as an air spring for power cylinder 500. The other outlet of tee union 671 is connected via a conduit 673 to a pressure gage 674 that is connected to the downstream side of a pressure regulator 675 which controls the pressure delivered to the end of power cylinder 500 closest to the piston rod 502. Pressure regulator 675 is generally set up to be in the range of from 0–8 lbs. per square inch and is preferably about 6 lbs. per square inch so that any pressure below 6 lbs. per square inch (which corresponds to about a volt input to the precision pressure regulator VIP-1) results in no torque output by the torque test cylinder 500 and that pressures from 6 lbs. per square inch through 30 lbs. per square inch (corresponding to about 1 volt to 5 volts input to regulator VIP-1) result in torque outputs from the torque test cylinder 500 which increase proportionally to the increase in pressure in the accumulator chamber 667.

When solenoid valve SV-6 is de-energized, the conduit 669 is depressurized by being bled to atmosphere and the piston rod 502 of torque test cylinder 500 is retracted into the cylinder due to the pressure in conduit 670 and accumulator chamber 672.

It is noted that the pressure regulator 627, which reduces the 80 lbs. per square inch pressure delivered to pneumatic system 620 to about 50 lbs. per square inch, is provided with a pressure gage 676 to allow the user to properly set the reduced compressed air pressure. Similarly, pressure regulator 661, which reduces the 50 lbs. per square inch pressure to about 30 lbs. per square inch, is also provided with a pressure gage 677 to allow the user to properly set the 30 lbs. per square inch pressure.

Referring to FIGS. 11–18, the electrical and logic circuits employed in controlling and operating the torque tester 10 will now be considered in greater detail. Table I below lists and describes the functions of many of the solenoid valves, power cylinders, push buttons, switches, potentiometers and other elements used in the electrical, logic and pneumatic circuits in controlling the torque tester. It is added at this point to provide a convenient reference list for these components:

TABLE I

| Components | DESCRIPTION OF COMPONENTS Description |
|---|---|
| SV-1 | Reject gate valve (cylinder 250) |
| SV-2 | Container clamp valve (cylinder 360) |
| SV-3 | Container cap (collet) clamp valve (chamber 436) |
| SV-4 | Tester head vertical lift valve (cylinder 385) |
| SV-5 | Feed screw valve (cylinder 310) |
| SV-6 | Torque test valve (cylinder 500) |
| SV-7 | Main air to pneumatic system valve |
| CYL-252 | Reject gate cylinder |
| CYL-360 | Container clamp cylinder |
| CYL-436 | Container cap (collet) clamp extension chamber |
| CYL-385 | Tester head vertical lift cylinder |
| CYL-310 | Feed screw cylinder |
| CYL-500 | Torque test cylinder |
| LS-1 | Feed screw in position limit switch |
| PB-1 | "Power-On" push button/with light (energizes SV-7) |
| PB-2 | "Cycle Start" push button |
| PB-3 | "Cycle Stop" push button |
| PB-4 | "Emergency Stop" push button (maintained push) |
| PP-1 | Minimum/Maximum torque set-point potentiometer |
| PP-2 | Conveyor speed potentiometer |
| PP-3 | Cycle speed potentiometer |
| MSG-1 | 80 character message center |
| SW-1 | Calibrate/Run selector switch |
| SW-2 | Set Min./Set Max. selector switch |
| SW-3 | Spare (not used) |
| SW-4 | Surge On/Off selector switch |
| SW-5 | Test/Set-Up selector switch |
| SW-6 | Container clamp On/Off selector switch |
| SW-7 | Container cap (collet) clamp On/Off selector switch |
| SW-8 | Test head Up/Down selector switch |
| PE-1 | Conveyor backlog photo-eye |
| PE-2 | Reject area backlog photo-eye |
| VIP-1 | Precision pressure regulator |
| SG-1 | Strain gage transducer 65 |

TABLE I-continued
DESCRIPTION OF COMPONENTS

| Components | Description |
|---|---|
| PD-1 | Peak detector |
| M-1 | Conveyor drive motor 210 |

Figure 11:
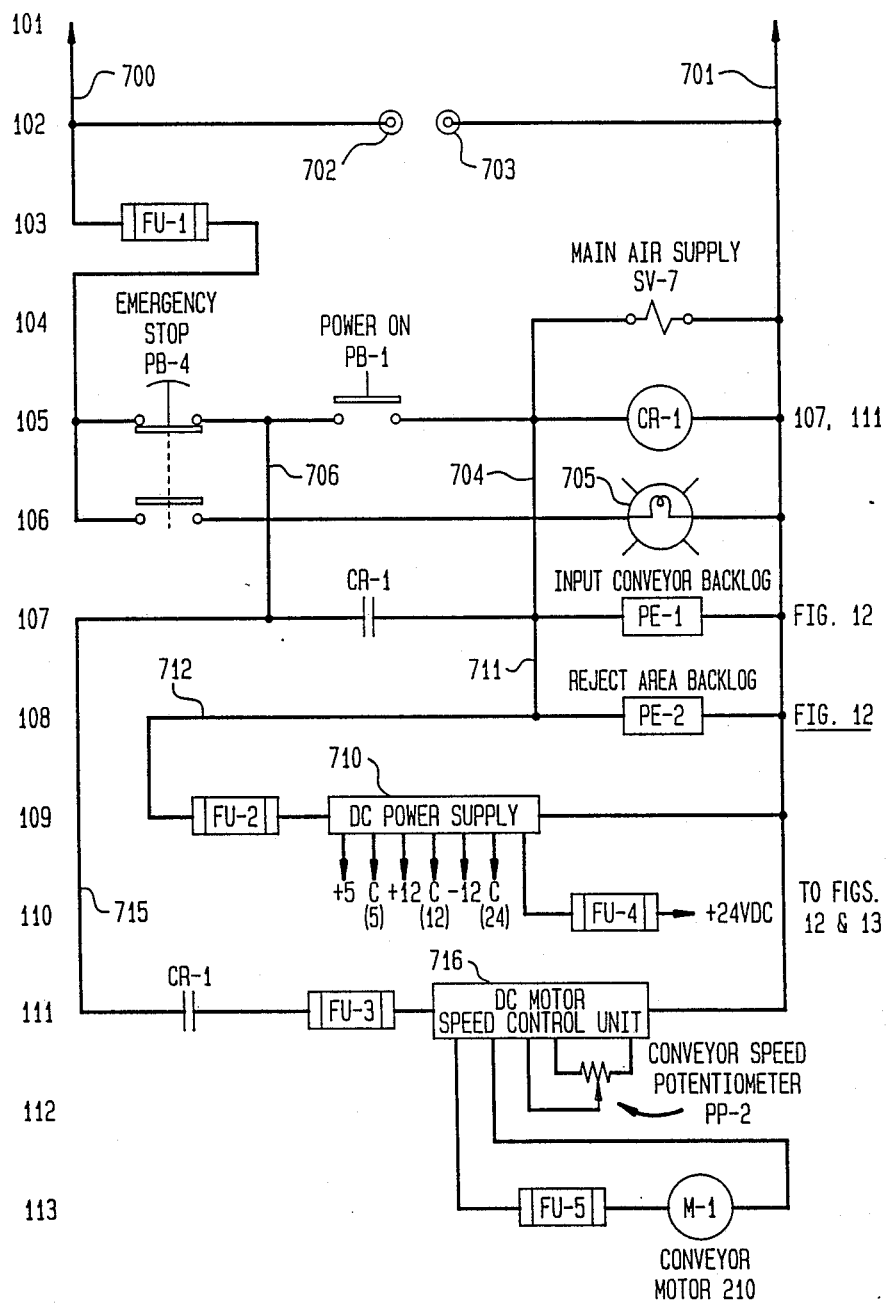
FIG. 11 is a circuit diagram of the 120 volt AC portion of the electrical system employed in controlling the torque tester.

Referring now to FIG. 11, which comprises a circuit diagram of the 120 V AC portion of the electrical system employed in controlling the torque tester 10, a line numbering system has been employed to facilitate the description of the electrical system. The line numbers have been listed on the left side of FIG. 11 and they run consecutively from line No. 101 through line No. 113. The line numbers on which the contacts of relays and photocells appear have been listed to the right of the relays and photocells they refer to, and normally closed contacts are indicated by underlining in the listing. Thus, referring to FIG. 11, relay CR-1 (line 105) is provided with two sets of normally open contacts, one in line 107 and one in line 111, photocell PE-1 is provided with a set of normally open contacts in FIG. 12, and photocell PE-2 is provided with a set of normally closed contacts in FIG. 12.

The 120 V AC voltage is brought in from a source (not shown) at line 101, via conductors 700 and 701. A pair of line cord terminals 702, 703 is provided to allow access to the 120 V AC circuit for measurement thereof or to provide a convenient point for connection thereto. A fuse FU-1 (line 103) is provided in conductor 700 to protect against overload.

Torque tester 10 is energized by means of a "power-on" push button PB-1 (line 105) which, when depressed, energizes a control relay CR-1 (line 105) and a main air supply valve SV-7 (line 104) through the contacts of "emergency stop" push button PB-4 in line 105 and the contacts of power-on push button PB-1 in line 105. Emergency stop push button PB-4 (line 105) is a two position, maintained, push button switch which remains at whichever of its two positions it is placed in by the user, until it is manually shifted by the user. When the torque tester is ready to be run, push button PB-4 is placed in the position shown in FIG. 11. When the machine is to be stopped, the push button is depressed from the condition shown in FIG. 11 so that its contacts in line 105 open and its contacts in line 106 close. This condition is indicated by the illumination of a lamp 705.

The energization of control relay CR-1 causes its repective sets of contacts in lines 107 and 111 to close. The closing of contacts CR-1 in line 107 locks control relay CR-1 (line 105) in the energized condition, bypassing power-on push button PB-1 (line 105) via conductors 706 and 704 which interconnect lines 105 and 107. Thus, power-on push button PB-1 (line 105), which is a spring return push button, can be released at this time and the system remains energized. The closing of contacts CR-1 in line 107 also results in the energization of main air supply solenoid valve SV-7, which provides air to the pneumatic circuits of FIG. 10, and energizes input conveyor backlog photocell PE-1 (line 107) and reject area backlog photocell PE-2 (line 108). The contacts of photocells PE-1 and PE-2 in FIG. 12 assume the conditions shown in FIG. 12 in the absence of their photocells being blocked by containers backlogging at either the input conveyor area or the reject container area of the torque tester.

In addition, the closing of contacts CR-1 in line 107 energizes a DC power supply 710 (line 109) via conductors 711 and 712 which interconnect line 107 with line 109. The DC power supply 710 is protected by a fuse FU-2 (line 109). DC power supply 710 (line 109) provides a number of DC voltage outputs, shown at line 110, including a 5 V DC output, a 12 V DC output, a negative 12 V DC output, a 24 V DC output and a common or ground line for each of the foregoing DC voltages. DC power supply 710 is preferably a Model SPL53-4101 DC power supply made by Power-One of 740 Calleplano Road, Camarillo, Calif. 93010. The positive 24 V DC voltage from power supply 710 is protected by a fuse FU-4 (line 110). The DC voltage outputs (line 110) from power supply 710 are employed in the circuits shown in FIGS. 12 and 13, as will appear in greater detail hereinafter.

The contacts of control relay CR-1 in line which close when relay CR-1 (line 105) energizes, provide 120 V AC power from line 105 via conductors 706 and 715 to line 111. This energizes a DC motor speed control unit 716, which is protected by a fuse FU-3 and includes a conveyor speed potentiometer PP-2 (line 112) therein. DC motor speed control unit 216 is connected via a fuse FU-5 (line 113) to conveyor motor M-1 (line 113). Conveyor motor M-1 is also identified as motor 210 in FIGS. 2 and 7. Thus, conveyor motor M-1 (line 113) energizes, driving the conveyor 200 (FIG. 2) at a speed selectable by potentiometer PP-2 (line 112). Control unit 216 is preferably a Model No. KB1C-125 solid state DC motor speed control made by KB Electronics, Inc. of 73 Wortman Avenue, Brooklyn, N.Y. 11207.

Figure 12:
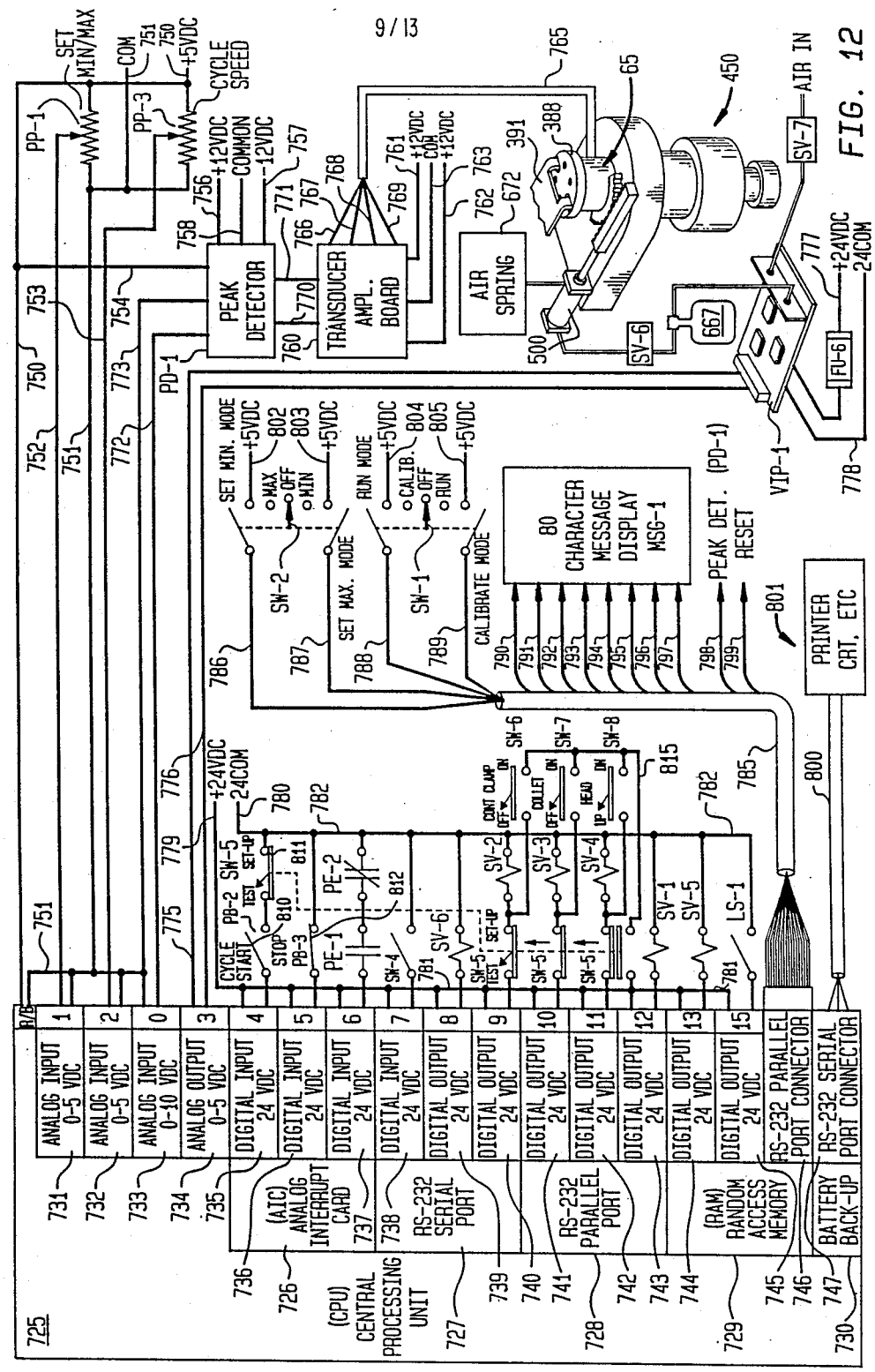
FIG. 12 is a circuit diagram of the DC portion of the electrical system employed in controlling the torque tester and including portions of the pneumatic circuits utilized in such control.

Referring to FIG. 12, the DC portion of the electrical system employed in controlling the torque tester 10, and the interface of such DC circuits with the software-controlled computing equipment of the torque tester, have there been illustrated. The computing equipment employed includes a central processing unit (CPU), shown generally at 725, having a plurality of primary plug-in cards or boards therein, including an analog interrupt card (AIC) 726, an RS-232 serial port card 727, an RS-232 parallel port card 728, a random access memory (RAM) card 729, and a battery backup card 730. The central process unit 725 also includes a plurality of secondary input/output plug-in modules or boards therein, including to 0-5 V DC analog input modules 731, 732, a 0-10 V DC analog input module 733, a 0-5 V DC analog output module 734, four 24 V DC digital input modules 735-738, seven 24 V DC digital output modules 739-745, an RS-232 parallel port connector card 746 and an RS-232 serial port connector card 747.

The central processing unit 725 and the various card and modules 726-747 thereof preferably comprise a "BTL Basic/Stack 65" control computer system, made by Dutec Inc. of 4801 James McDivitt Road, P.O. Box 964, Jackson, Mich. 49204. The BTL Basic/Stack 65 computer is a programmable machine control computer system that includes built in software which cooperates with the user's software program to automatically update each input and output point of the computer after each user program line is executed, so that the system is always processing current information. The computer includes a master terminal board (not shown) which includes a plurality of input/output terminals, identified as terminals 0-15 on FIG. 12, into which the various respective modules 733, 731, 732 and 734-745 plug in. The master board also includes a pair of terminals, identified "R/B" on FIG. 12, to which a positive 5 volt DC line 750 and a 5 volt DC common line 751 are connected.

The central processing unit card 725 plugs into a set of cooperating jacks (not shown) on the master board and, in turn, has the RAM card 729 and battery back-up card 730 stacked on top of it and plugged into jacks on its upper surface. The master board, CPU card 725 and RAM and battery back-up cards 729 and 730 comprise components of the BTL/Basic Stack 65 computer identified by the single part number "S65A-16P". The analog interrupt card 726 stacks upon and plugs into jacks on the top of RAM and battery back-up cards 729 and 730; it is identified by its part number "AIC". The RS-232 parallel port connector card 746 stacks upon and plugs into jacks on the top of AIC card 726; it is identified by its part number "COM2P". The RS-232 serial port connector card 747 stacks upon and plugs into jacks on the top of RS-232 parallel port connector card 746; it is identified by its part number "COM2S".

Referring to FIGS. 11 and 12, together, the 5 V DC output and its common line from the DC power supply 710 in line 109 of FIG. 11 are delivered to the central processing unit 725 in FIG. 12 via respective conductors 750 and 751. Potentiometer PP-1, which is used to set the level of decapping torque applied to the capped container at the torque testing station, and potentiometer PP-3, which controls the cycle speed of the torque testing apparatus, are connected across the lines 750 and 751. The center tap of potentiometer PP-1 is connected via line 752 to analog input board 731, and the center tap of potentiometer PP-3 is connected via line 753 to analog input board 732.

The positive and negative 12 volt DC outputs of DC power supply 710 and a common line therefor ar connected to the peak detector PD-1 in FIG. 12 via respective lines 756, 757 and 758. A 5 V DC input to peak detector PD-1 is provided via a line 754 which interconnects the peak detector with conductor 750. Positive and negative 12 V DC lines and a common line therefor are also provided to a strain gage transducer amplifier module or board, shown generally at 760, via conductors 761, 762 and 763, respectively. A 4-conductor cable 765 interconnects strain gage transducer 65 with the strain gage transducer amplifier 760 and provides signal inputs thereto from the bridge resistance network of the strain gage 65 via conductors 766, 767, 768 and 769 in cable 765.

Peak detector PD-1, the operation of which will be described in greater detail hereinafter, is preferably a model No. 4085KG peak detector manufactured by the Burr Brown Co. of 6730 South Tucson Boulevard, Tucson, Ariz. 85706. The strain gage transducer amplifier board 760 is preferably a model No. 42M572-16067 strain gage amplifier module, made by GSE, Inc. of 23640 Research Drive, Farmington Hills, Mich. 48024-1090. The operation of the strain gage amplifier module 760 will also be discussed in greater detail hereinafter, it being sufficient to note at this point that the output of amplifier 760 is inputted to peak detector PD-1 via lines 770 and 771, and the output of peak detector PD-1 is inputted to analog input module 733, and therefore to the central processing unit 725, via lines 772 and 773. The central processing unit 725 develops and provides a variable analog output signal of up to 24 volts DC and transmits this signal via analog output module 734 and conductors 775 and 776 to the precision pressure regulator valve VIP-1. The manner in which the level of the analog output of module 734 is varied will be discussed in greater detail hereinafter, it being sufficient at this point to note that changes in this level result in changes in the pressure of compressed air going to the torque test power cylinder 500 that controls the decapping torque applied to container caps at the torque testing station.

The positive 24 V DC voltage and its 24 volt common line provided by DC power supply 710 in line 109 of FIG. 11 are brought into the DC control circuits of FIG. 12 on two separate pairs of lines, one pair of which comprises conductors 777 and 778 and the other pair of which comprises conductors 779 and 780. Positive 24 V DC line 777 is connected through a fuse FU-6 to the precision pressure regulator VIP-1 and 24 V common line 778 is also connected to the valve VIP-1. Lines 777 and 778 provide main power for energizing the electrical components of this valve. Precision regulator VIP-1 is preferably a model VIP pressure control unit made by LDI Pneutronics Corp. of 2 Lomar Park, E. Pepperell, Mass. 01463.

The positive 24 V DC voltage brought into the DC control circuits of FIG. 12 by line 779 is connected to each of the 24 V DC digital input modules 735-738 and to each of the 24 V DC digital output modules 739-745. The 24 volt common conductor 780 is connected to a 24 V common bus 782 which interconnects the common side of a plurality of components the other sides of which are connected to various of the modules 735-745, as will be discussed in greater detail hereinafter.

Figure 13:
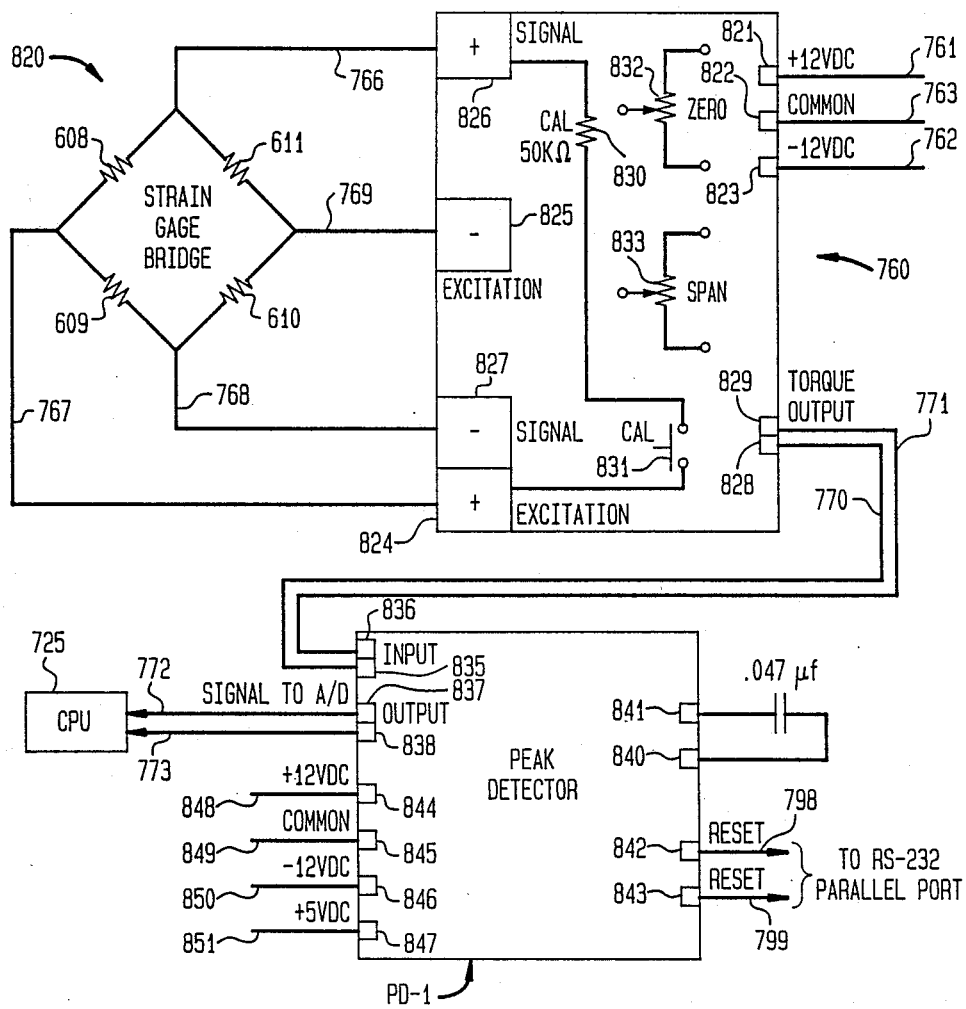
FIG. 13 is a view in somewhat greater detail of a strain gage amplifier and a peak detector unit included in the circuit diagram of FIG. 12.
Figure 14:
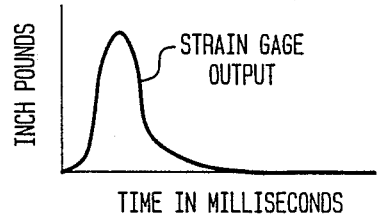
FIG. 14 is a graph, in rectangular coordinates, of the output of the strain gage amplifier, showing torque in inch pounds as the ordinate and time in milliseconds as the abscissa.

The RS-232 parallel port connector 746 is connected to a number of components via a 16-conductor cable 785, 14 of the conductors 786-799 of which are utilized in the control circuits of FIG. 12 and 13. Conductors 786 and 787 of cable 785 interconnect the switch SW-2 to the central processing unit 725; conductors 788 and 789 connect the switch SW-1 with the central processing unit 725; conductors 790-797 interconnect the 80 character message display module or unit MSG-1 with the central processing unit 725, and conductors 798 and 799 interconnect the peak detector PD-1 with the central processing unit 725 in connection with resetting the peak detector between cycles of the torque tester. As will be described in greater detail hereinafter, the switch SW-2 is employed in connection with setting the minimum and maximum torque set points of the torque tester; and the switch SW-1 is employed in calibrating the torque tester. Lines 802, 803, 804 and 805 interconnect through the parallel port 746 via conductors (not shown) to supply 5 V DC voltage to switches SW-1 and SW-2.

The 80 character message display unit MSG-1 provides alphanumeric displays of signals generated by the torque tester that are readable by the user of the apparatus. Unit MSG-1 is preferably a model DE280A display module made by Digital Electronics Corp. of 26142 Eden Landing Road, Hayward, Calif. 94545.

The RS-232 serial port connector 747 may be connected by a 3-conductor cable 800 to a printer or cathode ray tube or the like, shown generally at 801, to provide permanent or viewable records of the test results of the torque tester.

Referring in FIG. 12 to the various 24 V DC circuits interconnected between the 24 V DC common bus 782 and the digital input and output modules 735-745, the contacts 810 of cycle start push button PB-2 are serially connected with the contacts 811 of test/set-up switch SW-5 between module 735 and common bus 782. With the test/setup switch SW-5 in its test position, depression of cycle start push button PB-2 causes its contacts 810 to close, providing a signal through input module 735 to the central processing unit 725 to start a test cycle. The normally closed contacts 812 of cycle stop push button PB-3, interconnected between bus 782 and input module 736, open when the cycle stop push button PB-3 is depressed. This provides a signal to the central processing unit 725 to stop the cycling of the torque tester.

The normally closed contacts PE-2 of reject area photocell PE-2 remain closed in the absence of a backup of defective containers in the reject channel 253 (FIG. 1) of the torque tester. When channel 253 fills up, the photocell blocks and its contacts PE-2 open, interrupting a circuit between digital input module 737 and the bus 782. This circuit is normally completed by normally open contacts PE-1 of input conveyor photocell PE-1, which normally open contacts close when a backlog of containers to be tested fills up channel 277 (FIG. 1), signifying that the torque tester is ready to be operated. It will thus be seen that during normal operation of the torque tester, the contacts of both photocells PE-1 and PE-2 are closed, connecting module 737 to the bus 782. Accordingly, either an exhaustion of containers in the input conveyor channel 277 or an excess of containers in the reject container channel 253 will cause a signal to be inputted to the central processing unit 725 via module 737 that the torque testing operation should be interrupted.

The contacts of surge switch SW-4 in the line interconnecting digital input module 738 and bus 782 are normally open during testing for minimum release torque of container caps at the torque testing station. When switch SW-4 is turned on, its contacts in the line to module 738 close, signalling the central processing unit 725 that the container at the torque testing station is to be given a maximum torque test. This should result in the release of the cap at that station, followed by movement of the container cap at that station into the reject channel 253 and a reading provided on message display unit MSG-1 of the value of the torque at which the cap released. Suitable alarms can be provided in the event the cap does not release under the maximum torque application.

As indicated earlier in connection with the discussion of the pneumatic circuits of FIG. 10., solenoid valve SV-6 controls the flow of compressed air from the precision pressure regulator VIP-1 and accumulator chamber 667 to the torque test cylinder 500. This valve is energized at the appropriate times during the torque tester cycle to apply torque through strain gage 65 either to the cap of a clamped container of the torque testing station, or to the cap plate 388 when it is engaged with the lugs 392, 393 of L-shaped arm 391 (FIGS. 2 and 3) during resetting of the torque level between cycles of the torque tester.

With the test set-up switch SW-5 in its test position, its contacts in the lines to modules 740, 741 and 742 are all closed so that respective solenoid valves SV-2, SV-3 and SV-4 are controlled by the central processing unit 725. Solenoid valve SV-2 controls the movement of the container clamps; solenoid valve SV-3 controls the clamping of the container cap. Solenoid valve SV-2 controls the movement of the container clamps 350, 351 (FIG. 5); solenoid valve SV-3 controls the container cap grasping means 40 (FIG. 8); and, solenoid valve SV-4 controls the vertical movement of the tester head 450 (FIG. 3). When the test set-up switch SW-5 is switched to its set-up position, its contacts in the line to module 736 open, preventing the cycle start push button PB-2 from taking effect to start a cycle while the torque tester is in the set up condition; its contacts in the lines to modules 740–742 open; and, its contacts in line 815 close, connecting the positive 24 V DC bus 781 to one side of each of the switches SW-6, SW-7 and SW-8. The other sides of the various switches SW-6, SW-7 and SW-8 are connected, respectively, to solenoid valves SV-2, SV-3 and SV-4 so that these valves can be individually energized by the switches.

Accordingly, when test/set-up switch SW-5 is in its set-up condition and switch SW-6 is moved from its "off" to its "on" position, its contacts SW-6 close, energizing solenoid valve SV-2 to clamp a container at the torque testing station. Similarly, when switch SW-7 is moved from its "off" to its "on" position, its contacts close, energizing solenoid SV-3 to grasp the container cap on the container at the torque testing station. Also, when switch SW-8 is moved from its "up" position to its "down" position, solenoid valve SV-4 is energized, moving the torque tester head 450 down so that the container cap grasping means 40 encircles the container cap at the torque testing station. Switching the test/set-up switch SW-5 back to its "test" position disconnects the switches SW-6, SW-7 and SW-8 from their control of solenoid valves SV-2 through SV-4 and transfers control of these solenoid valves to the central processing unit 725.

Solenoid valve SV-1, which controls movement of the reject gate cylinder 250 (FIG. 1), is connected between bus 782 and module 743 and its operation is controlled by the central processing unit 725. Similarly, solenoid valve SV-5, which controls the power cylinder 310 (FIG. 7) that rotates the feed screw 280, is interconnected between module 744 and bus 782 and its energization is controlled by central processing unit 725. Also, limit switch LS-1, which closes when the feed screw 280 has advanced a new container to be tested into the torque testing station, is connected between bus 782 and module 745 and provides a signal to the central processing unit 725 of that event. The central processing unit 725, in turn, then de-energizes the solenoid valve SV-5, causing the piston of power cylinder 310 to retract into the cylinder, reopening the contacts of limit switch LS-1 in the line between bus 782 and module 745.

Figure 16:
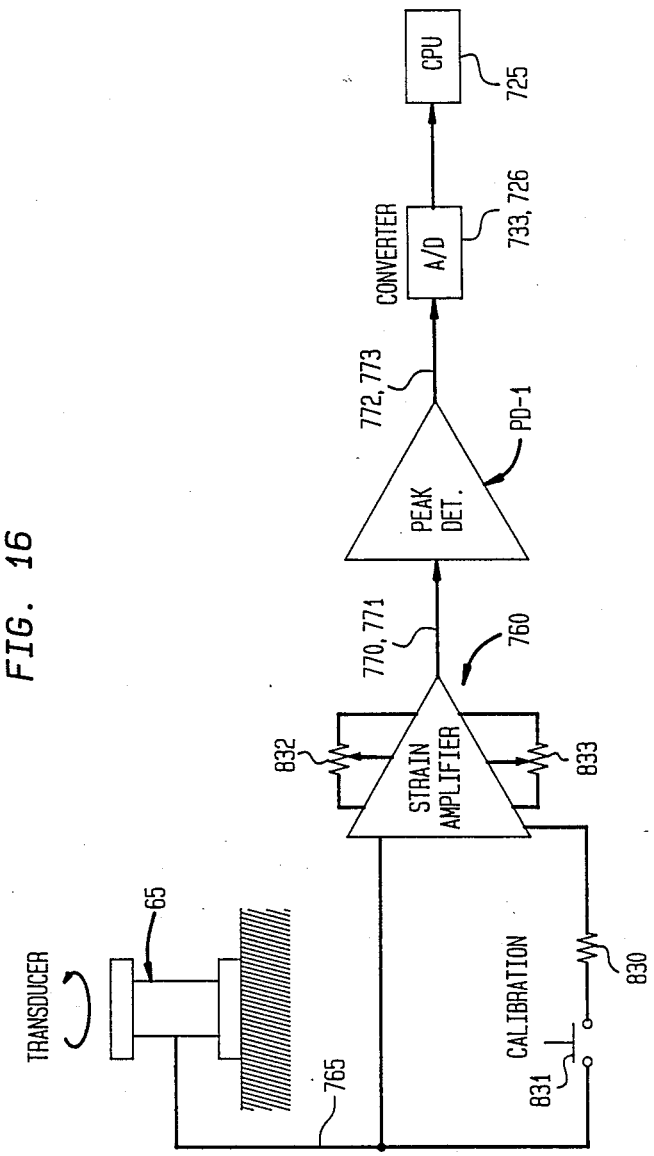
FIG. 16 is a synoptic diagram of the signal path which a torque signal generated by a strain gage transducer follows to reach a central processing unit that is utilized in the torque tester.

Referring now to FIGS. 13 and 16, wherein strain gage amplifier 760, and peak detector PD-1 and their interrelationship with other components are shown in somewhat greater detail, strain gage pads 608–611 are connected in a Wheatstone bridge arrangement, shown generally at 820. The bridge arrangement 820 is connected to the strain gage amplifier 760 via the lines 766–769, previously referred to. The strain gage amplifier 760 is provided with ten terminals, nine of which are shown at 821–829. The positive, common, and negative 12 V DC voltages on lines 761, 763 and 762, respectively, of FIG. 12 are brought into amplifier 760 on the respective terminals 821, 822 and 823. Terminals 824 and 825 of strain gage amplifier 760 provide respective positive and negative 5 V DC excitation to lines 767 and 769 going to the Wheatstone bridge arrangement 820. Terminals 826 and 827 receive the respective positive and negative signal voltages back from the Wheatstone bridge arrangement 820 on respective lines 766 and 768; and, terminals 828 and 829 provide the amplified torque output signal and a common line output connection to lines 770 and 771 going to the peak detector PD-1.

A calibration resistor 830 of approximately 50,000 ohms and a calibration push button 831 are serially connected between the terminals 824 and 826 to provide a known calibration voltage input to the strain gage amplifier 760 when the amplifier is to be calibrated. In addition, a zero-set potentiometer 832 and a span, or linearity, potentiometer 833 are provided internally of the amplifier 760 which may be adjusted during calibration of the amplifier to insure that there is a zero output voltage from the amplifier when there is a zero input thereto, and to insure that the output of the amplifier when a known, relatively high, input signal is applied is correct. The output voltage of the strain gage amplifier 760 is typically calibrated with the use of a manufacturer-supplied precision calibration resistor so that the output voltage of the strain amplifier 760 is in precisely a 1 to 10 relationship with the inch pounds of torque applied to the strain gage transducer 65. Thus, for example, when strain gage transducer 65 has a 30 inch pound torque applied thereto and the amplifier 760 has been properly calibrated, a 3 V output, corresponding to 30 inch pounds of torque, would be delivered across the output terminals 828 and 829 of the amplifier Referring to FIG. 14, wherein the strain gage amplifier output, in inch pounds, is plotted against time, in milliseconds, it will be seen that during a torque test on a capped container, the torque is rapidly applied until it reaches a predetermined value, and then is quickly released once it has reached that value. This occurs in a few milliseconds of time and in order to preserve the peak value reached by the strain gage during the test, the output value of the strain gage amplifier 760 is introduced into the input of the peak detector PD-1 at the terminals 835 and 836 thereof. The internal circuitry of the peak detector is arranged to capture and hold the foregoing peak torque value sufficiently long for the signal to be transmitted to and read by the central processing unit 725. The peak torque value generated by the strain gage amplifier and captured by the peak detector PD-1 is transmitted from the peak detector via output terminals 837 and 838 and through previously mentioned conductors 772 and 773 to central processing unit 725.

Figure 15:
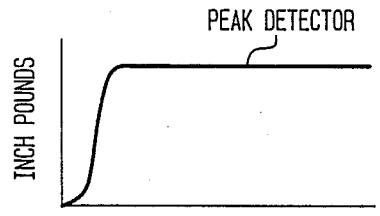
FIG. 15 is a graph, in rectangular coordinates, of the output of the peak detector unit, showing torque in inch pounds as the ordinate and time in milliseconds as the abscissa.

Referring to FIG. 15, which shows a plot of the peak torque input to peak detector PD-1 versus time in milliseconds, in conjunction with FIG. 13, it will be seen that the peak value of the torque input to the peak detector is retained for a significant period of time, in milliseconds. This period of time is determined by the value of a capacitor 839 (FIG. 13) which is connected across terminals 840 and 841 of the peak detector. For example, the 0.047 microfarad capacitor 839 provides a peak holding time of approximately 300 milliseconds, allowing sufficient time for the central processing unit 725 to receive and act on the peak torque value information received.

Peak Detector PD-1 is also provided with terminals 842 and 843 therein which are connected to lines 798 and 799 of FIG. 12 that go to the RS-232 parallel port module 746 of FIG. 12. When the central processing unit 725 has accepted and acted upon the peak torque value received from the peak detector PD-1, a reset signal is generated by the central processing unit and sent via the RS-232 parallel port module 746 to terminals 842 and 843. This resets the peak detector PD-1 to ready it for the next container cap cycle.

Positive and negative 12 V DC supply lines, a positive 5 V DC supply line, and a common line are connected to the peak detector PD-1 at terminals 844-847 thereof. The 12 V and 5 V supplies are delivered from the DC power supply 710 in line 109 of FIG. 11 via lines 848-851.

Referring to FIGS. 10, 11 and 12, a "manual mode" of torque tester operation will now be considered. Assuming that power-on push button PB-1 (FIG. 11, line 105) has previously been depressed so that control relay CR-1 (FIG. 11, line 105) is energized, closing its contacts in line 107 and energizing solenoid valve SV-7 (FIG. 11, line 104), photocells PE-1 and PE-2 (FIG. 11, lines 107 and 108), DC power supply 710 (FIG. 11, line 109), DC motor speed control unit 716 (FIG. 11, line 111) and conveyor motor M-1 (FIG. 11, line 113), the torque tester control circuits are ready to have minimum and maximum de-capping torque levels set up into them.

With Test/Set-Up selector switch SW-5 (FIG. 12) in the "test" position, Set Min/Set Max selector switch SW-2 is moved from its "off" position to its "min" position, providing a positive 5 V DC signal through conductor 786 of cable 785 and through RS-232 parallel port connector module 746 to the central processing unit 725. As a result of this, the central processing unit (hereinafter also referred to as "CPU") 725 provides a positive 24 V DC output to solenoid valve SV-6, energizing that solenoid valve. In addition, CPU 725 generates a message which is sent to the 80 character message display unit MSG-1 via cable 785 that reads "Set Minimum Acceptable Torque—00.0 Inch Pounds."

It should be noted at this point that solenoid valve SV-4 is and has heretofore been de-energized so that the torque tester head 450 is in its upper or raised position, wherein the cap 388 is engaged by the lugs 392 and 393 on L-shaped arm 391. Accordingly, the energization of solenoid valve SV-6, which applies air to power cylinder 500 to rotate the head 450 counter clockwise, as viewed in FIG. 12, results in no movement of the head 450 as the air pressure in power cylinder 500 is increased. However, since the head 450 is locked against the arm 391, it is torqueing against a fixed object, allowing the strain gage 65 to output a signal proportional to the torque applied thereto.

As the potentiometer PP-1 is raised or lowered, the center tap voltage thereof appearing across lines 751 and 752 is applied to the CPU 725 via analog input module 731. This voltage is transmitted through the CPU 725 to its analog output module 734 and thence via line 775 and 776 to the precision pressure regulator VIP-1, causing corresponding pressure changes in accumulator 667 and power cylinder 500. The torque on head 450 changes accordingly, and the change in torque output of strain gage 65 is amplified in strain gage amplifier 760, detected in peak detector PD-1, and returned to CPU 725 via conductor 772 and 773 and analog input module 733. CPU 725 in turn sends a new message to the message display unit MSG-1, reading the new torque value directly in inch pounds on the display unit.

Figure 17:
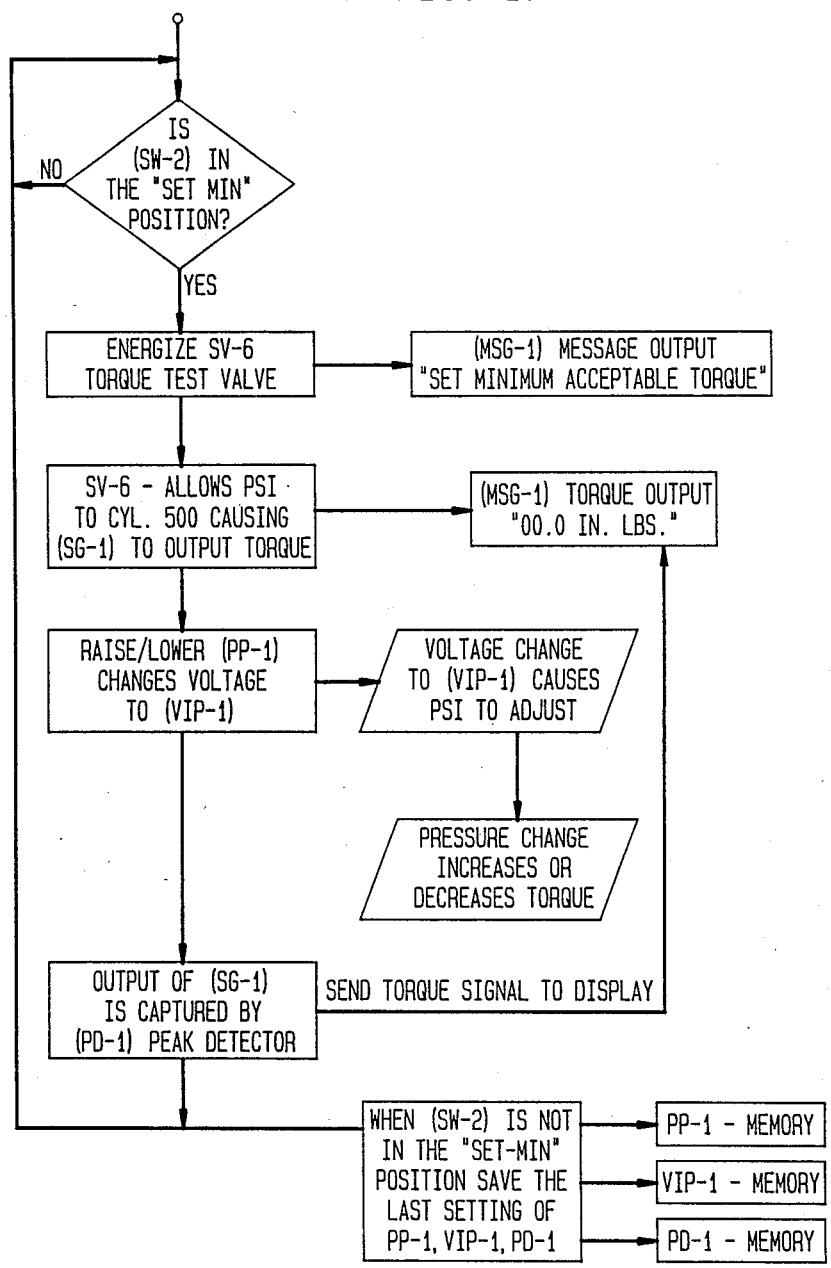
FIG. 17 is a synoptic diagram of a logic circuit employed by the central processing unit of the torque tester.

Referring to FIG. 17, a flow chart of the operations involved and logic employed by the computer software in setting the minimum torque level during manual mode operation has been illustrated. The initial logical question asked by the software is: "Is switch SW-2 in the 'set min' position." If the answer is "no", the computer is instructed to save in its memory the last settings of the "set min" potentiometer PP-1, the precision pressure regulator VIP-1 and the peak detector PD-1.

If the question is answered "yes", the software energizes torque test solenoid valve SV-6, and sends a message to the message display unit MSG-1 that reads "Set Minimum Acceptable Torque". The energization of torque test solenoid valve SV-6 allows compressed air to be applied to torque test power cylinder 500, causing the strain gage 65 (SG-1) to output torque as the pressure level builds up. In addition a message is sent to the message display unit MSG-1 that reads "00.0 inch pounds" (prior to the build-up of the pressure level). At this point, raising the setting of potentiometer PP-1 changes the voltage going to precision pressure regulator VIP-1 and this, in turn, changes the torque output of torque test power cylinder 500 and the voltage output of the strain gage 65 (SG-1). The corresponding output voltage changes of strain gage amplifier 760 are delivered to the peak detector PD-1 and the peak value thereof is captured and sent to the CPU 725. The software circuits then send a new torque value message signal to the message display unit MSG-1, changing the value of the inch pounds of torque thereon to correspond to the value captured by the peak detector PD-1. The new values of potentiometer PP-1, precision pressure regulator VIP-1 and peak detector PD-1 are also stored in memory, replacing the previously stored values.

The foregoing procedure for setting the minimum torque test levels in the manual mode ar also applicable to setting the maximum torque levels in the manual mode of operation of the torque tester, with the only change occurring being that the Set Min/Set Max selector switch SW-2 is moved to its "max" position, rather than its "min" position, at the start of the procedure to provide a positive 5 V DC voltage to CPU 725 via conductor 787 and module 746, rather than via conductor 786 and module 746. Also, the messages provided to message display unit MSG-1 in this case will refer to maximum torque values, rather than minimum torque values. Accordingly, a detailed description of the operations involved and logic employed in setting the maximum torque level during manual mode operation need not be repeated at this point.

Referring to FIGS. 10–12 and 18, and assuming that the torque tester is still in the "manual mode" of operation, the manner in which the control circuits are calibrated to compensate for any torque loss due to variables, for example container clamp elasticity, container and cap elasticity, changes in ambient conditions, and changes in the force transmitted through the torque tester head 450, will now be considered It should be noted initially that setting an air pressure in the torque test power cylinder 500 when the head 450 is in its upper position (i.e., when cap plate 388 is locked to L-shaped arm 391) results in a strain gage output signal of, for example, 12 inch pounds of torque. When the torque tester is performing a test on an actual container with the same air pressure in cylinder 500, there can be a loss of two to three inch pounds of torque output signal due to the torque being applied to the container cap and container, rather than to the L-shaped arm 391. To correct for this, a "manual calibration" mode of the torque tester is employed to test either a number of containers, for example 10, or a simulation fixture, and to self-adjust the pressure output of the precision pressure regulator VIP-1 and accumulator 667 so that the de-capping torque applied to the container cap will be increased to the point where the strain gage output is equal to the original value that it was preset to during the "manual set min mode" of operation.

In the "manual calibration mode" of operation the Set Min/Set Max selector switch SW-2 must be in its "off" position, the eye of photocell PE-1 must be blocked and the eye of photocell PE-2 must be unblocked so that the circuit between digital input module 737 and the 24 V common line 782 is completed.

At this point, the Calibrate/Run selector switch SW-1 is switched to the "Calib" position, completing a 5 V DC input from line 805 through line 789, cable 785 and RS-232 parallel port connector module 746 to CPU 725. Ten very tight containers (or a simulation fixture) are now placed on conveyor belt 200 and the conveyor belt is brought to proper speed by adjusting the conveyor speed potentiometer PP-2. Next, the cycle start push button PB-2 is depressed to start operation of the software program. The central processing unit 725 now stores in memory all information to be saved (e.g., the values on the torque set point potentionmeter PP-1, the precision pressure regulator VIP-1 and the peak detector PD-1) that were set in during the "manual set min mode" of operation.

The operating portion of the software program will then proceed to initiate ten repetitive cycles in which the following steps occur. Feed screw solenoid valve SV-5 energizes to cycle the feed screw mechanism 280 and bring a new container into the torque testing station. When the feed screw limit switch LS-1 actuates, it provides a signal to central processing unit 725 that a container is in position. Accordingly, CPU 725 causes tester head vertical lift solenoid valve SV-4 to energize, bringing the head 450 down. Next, the container clamp solenoid valve SV-2 energizes, clamping the container at the torque testing station. Then the container cap clamp solenoid valve SV-3 energizes, clamping the container cap to the torque tester head 450; and, finally, torque tester solenoid valve SV-6 energizes for about 0.3 seconds, causing a counter rotational force or de-capping torque to be applied to the container cap. As a result of this, strain gage SG-1 outputs torque values and these values are amplified by strain gage amplifier 760. Peak detector PD-1 captures the peak torque value and this value is sent to CPU 725 which, in turn, generates a message that displays the peak value on the message display unit MSG-1 The software program then sequentially de-energizes solenoid valves SV-6, SV-3, SV-2, SV-5 and SV-4, stores the peak torque reading and adjusts the signal to precision pressure regulator VIP-1 so that the strain gage output incrementally moves in a direction tending to raise or lower the output of the peak detector PD-1 to make it equal the original value to which it was preset during the "manual set min mode" of operation.

An internal software counter will be satisfied when the foregoing ten repetitive cycles of calibration tests have been performed, and the CPU 725 will then output a message to the message display unit MSG-1 which reads "Ready—Unit Calibrated—Switch Cal/Run Switch to the Run Position". The calibrated value of the input to precision pressure regulator VIP-1 is also stored in memory at this time by CPU 725.

At this point the Calibrate/Run selector switch should be switched to the "Run" position and, when this is done, the message display unit MSG-1 will output a message reading "Depress Cycle Start To Begin Auto Testing". The "automatic cycle mode" may now be initiated by simply depressing the "Cycle Start" push button PB-2.

When the cycle start push button PB-2 is depressed, the torque test solenoid valve SV-6 energizes for about 0.3 seconds with the torque tester head 450 in its raised position and cap plate 388 locked to L-shaped arm 391. The precision pressure regulator VIP-1 signal that was stored at the end of the last "manual calibration mode" cycle is now applied to the precision pressure regulator, resulting in a new output signal from the strain gage SG-1. This signal, when amplified by amplifier 760 and detected by peak detector PD-1, becomes the new reference signal that is used to keep the torque testing pressure that goes to torque test power cylinder 500 constant during all subsequent tests. After the 0.3 second energization period of solenoid valve SV-6, that solenoid de-energizes and feed screw solenoid valve SV-5 energizes. Accordingly, the feed screw 281 rotates one revolution and then its limit switch LS-1 actuates. This, in turn, results in the sequential energization of tester head vertical lift solenoid valve SV-4, container clamp solenoid valve SV-2, container cap clamp solenoid valve SV-3 and the re-energization of torque test solenoid valve SV-6 for another 0.3 seconds. A decapping torque is thus applied to the container cap of the container that is clamped at the torque testing station and the strain gage SG-1 outputs a torque signal which is amplified by amplifier 760 and captured by peak detector unit PD-1. Peak detector unit PD-1 sends the peak torque signal to the central processing unit 725 and the message display unit MSG-I displays the actual torque reading.

If the peak torque captured by peak torque detector PD-1 is less than the minimum torque set point, then the container at the torque testing station is considered a reject and reject gate solenoid valve SV-1 is energized to divert that container to the reject area. Solenoid valves SV-5, SV-6, SV-3, SV-2 and SV-4 sequentially de-energize at this time and the automatic circuit is back to its starting point, at which it will recalibrate the signal to the precision pressure regulator VIP-1 with the tester head 450 at its upper, locked position. During the next automatic mode cycle, if the peak torque captured by the peak detector PD-1 reaches the minimum torque set point, the reject gate solenoid valve SV-1 will be de-energized so that the new container being tested will not be diverted to the reject area but, instead, will be cycled back toward the user's conveyor line.

Figure 18:
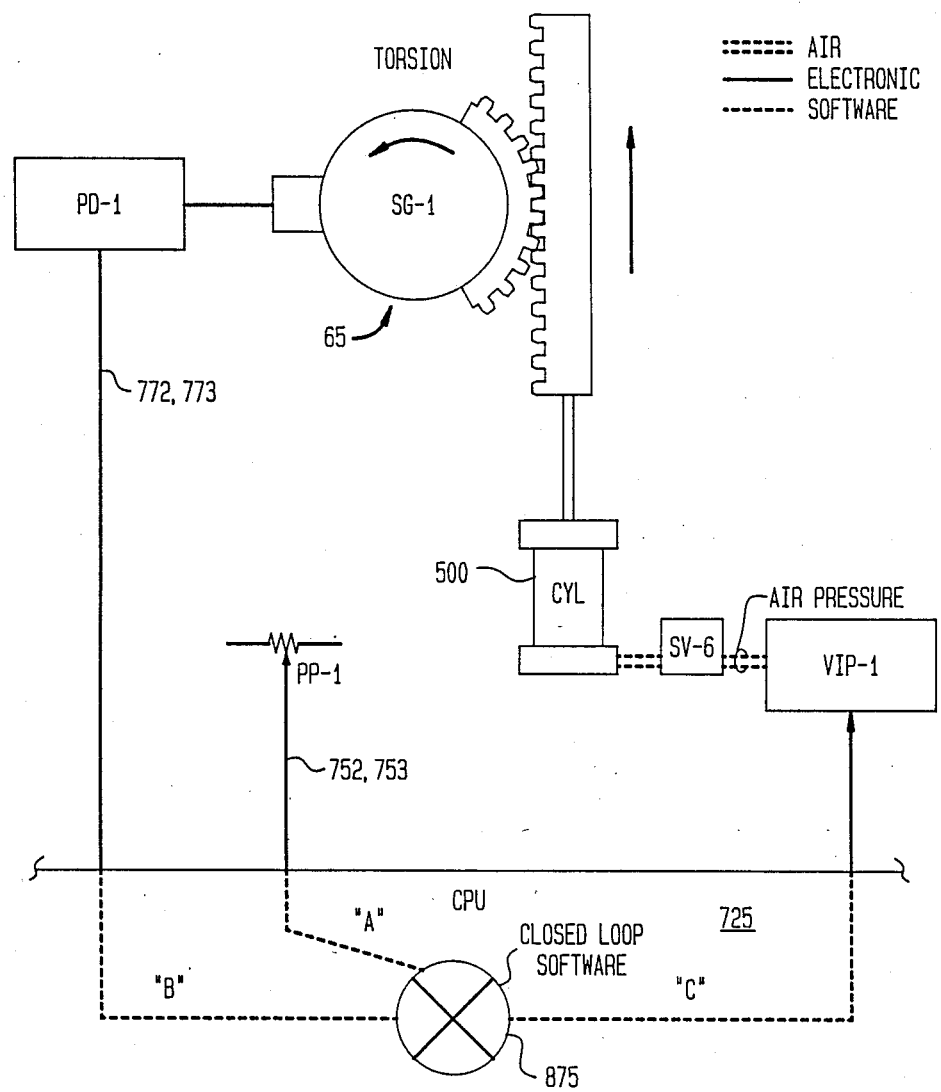
FIG. 18 is a synoptic diagram of a closed loop circuit used in controlling the operation of the torque tester.

Referring to FIG. 18, the closed loop employed in adjusting the voltage applied to the precision pressure regulator VIP-1 will be considered in somewhat greater detail at this time. When the operator is setting the minimum or maximum torque set point, he would adjust the voltage to the precision pressure regulator VIP-1 with the minimum/maximum torque set point potentiometer PP-1. The signal from potentiometer PP-1 would first go via lines 752 and 753 and a circuit "A" to the closed loop software 875 of central processing unit 725 so that the central processing unit can remember it for later use. Because one side of the testing head 450 is locked to the frame when the pressure increases or decreases to the precision pressure regulator VIP-1, and because the torque test solenoid valve SV-6 is energized to extend cylinder 500, the strain gage SG-1 outputs a torsion signal. Accordingly, during the Set Min/Set Max modes, the closed loop software 875 of central processing unit 725 receives actual torque readings from peak detector PD-1 via lines 772 and 773 and a circuit "B", and the corresponding electrical signals are stored. These signals can be used as reference points for checking the unit's torque testing pressures and accuracy and they enable the unit to recalibrate itself based o actual readings.

As described above in connection with the "automatic cycle mode" of operation, between each test cycle the torque test solenoid valve SV-6 is re-energized when the head 450 is in the up and locked position. This is done to verify and adjust the output voltage to the precision pressure regulator VIP-I. If there is any air pressure drift from the corresponding point of the previous automatic cycle, the central processing unit would sense this because the reading from peak detector PD-1 would not equal the calibrated stored value. The software would then compensate for this change and adjust the output voltage to precison pressure regulator VIP-1 to return the output of the peak detector to its calibrated, stored value. Differences of less than 1/10 of an inch pound of torque between the current signal from peak detector PD-1 and the calibrated, stored value of the peak detector are ignored by the central processing unit's software. An adjustment constant, for example 0.002, is applied to the error signal to limit the amount of voltage change that may be applied to the precision pressure regulator VIP-1 for each cycle. This prevents gross changes of pressure from occurring which might otherwise cause damage to the equipment.

A "surge mode" of operation for the torque tester is provided which will apply 25 percent more torque to the strain gage SG-1 than is applied by the maximum torque set point, so that each container cap will be released relative to its container and the actual breakaway torque thereof will be displayed. This mode of operation is similar to the "automatic cycle mode" described previously except that the reject gate solenoid valve SV-1 is constantly maintained in an energized condition. This assures that all containers with loose caps thereon are rejected. The "surge mode" of operation is initiated by switching surge on/off selector switch SW-4 (FIG. 12) to its "on" position, connecting input module 738 to common bus 782.

A cycle speed potentiometer PP-3 (FIG. 12) is provided to allow the operator to vary the time that is allowed to elapse between each test cycle during "automatic cycle mode" operation. Cycle speed potentiometer PP-3 is connected between the 5 V DC line 750 and the 5 V common line 751. Its center tap is connected to the analog input module 732 along with the 5 V common line 751.

The operation of the backlog photocells PE-1 and PE-2 will now be briefly considered. When the eye of the input conveyor backlog photocell PE-1 is blocked, it provides a signal via the closing of its contact PE-1 in FIG. 12 that there are containers to be tested. If it becomes unblocked, the torque tester will finish the cycle it is in and then wait for the eye of photocell PE-1 to again become blocked before it restarts automatic cycling.

Reject area backlog photocell PE-2 operates in a somewhat similar manner to photocell PE-1. In this case, however, the contacts PE-2 in FIG. 12 are normally closed when the eye of the photocell is not blocked. However, when the reject area becomes overcrowded, causing the eye of the photocell to become blocked, the contacts PE-2 in FIG. 12 open, signalling the central processing unit of that fact. The central processing unit, in turn, then stops its automatic cycling and waits for the eye of photocell PE-2 to become unblocked.

A cycle stop push button PB-3 is provided in FIG. 12 to interrupt the automatic mode of operation of the system. Once this push button has been depressed to stop the automatic operation, the cycle start push button PB-2 must be depressed to reinstitute automatic cycling.

TABLE II below comprises a software program, written in "BASIC" computer language, that may be employed with the computer hardware of the torque tester to control the operation of the torque tester in accordance with the previously described manual and automatic modes of operation thereof. In TABLE II the line numbers of the program are listed on the left side of the table and the operations, functions, data, descriptive material, etc., are listed on the right side of the table. The symbol "AN", as used in the program (e.g., at lines 0-3), informs the computer that an analog value is being inputted to or is to be outputted from the computer at the terminal board number thereof that corresponds to the line number. It directs the computer to send the signal through the analog interrupt card 726 to convert it to a form that is useable by the CPU 725, in the case of incoming analog signals, or is useable by the next downstream component, in the case of outgoing analog signals. The symbols "I" or "O" which preceed the symbol "AN" indicate whether the "AN" signal is an input or an output.

TABLE II
SOFTWARE PROGRAM

```
0 REM SG%,I,AN; PEAK DETECTOR PD-1
1 REM SE%,I,AN; TORQUE SET-POINT POTENTIOMETER PP-1
2 REM HB%,I,AN; CYCLE SPEED POTENTIOMETER PP-3
3 REM VI%,O,AN; PRECISION PRESSURE REGULATOR VIP-1
4 REM ST%,I; CYCLE START PUSH BUTTON PB-2
5 REM SP%,I,NC; CYCLE STOP PUSH BUTTON PB-3
6 REM BL%,I; BACK LOG PHOTOCELLS PE-1 AND PE-2
7 REM SO%,I; SURGE SWITCH SW-4
8 REM VT%,O; TORQUE TEST VALVE SV-6
9 REM VC%,O; CONTAINER CLAMP VALVE SV-2
10 REM VP%,O; COLLET VALVE SV-3
11 REM VH%,O; HEAD VALVE SV-4
12 REM VR%,O,NC; REJECT GATE VALVE SV-1
13 REM FS%,O; FEED SCREW VALVE SV-5
15 REM FL%,I; FEED LIMIT SWITCH LS-1
202 REM MN%,I; SET MIN
203 REM MX%,I; SET MAX
204 REM RN%,I; RUN
205 REM AP%,I; CAL
212 REM RP%,O,NC; PEAK HOLD
213 REM RP%,O,NO; PEAK RESET
4999 POKE4,3:POKE5,208:T8=USR(0):T8=0
5000 TR%=1
5100 GOSUB 10000
5108 POKE 18,255
5500 IF MN%=1 THEN GOSUB 7000:GOTO 5500
5510 IF MX%=1 THEN GOSUB 8000:GOTO 5500
5520 IF ST%=1 AND SP%=0 THEN GOSUB 6000:GOTO 5500
5599 GOTO 5500
6000 S%=SO%:GOSUB 9000:N1%=500:IF N%>0 THEN N1%=N%+1
6002 RP%=1:IF HB%>H1% THEN FS%=1:T1=MT/INT(HB%/ST):GOTO 6005
6003 IF SP%=1 THEN RETURN
6004 GOTO 6002
6005 FOR TT=1TO300:NEXT TT:IF AP%=1 THEN 6010
6006 RP%=0:VT%=1
6007 FOR CC=1TO100:NEXT CC
6008 IF ABS(SG%-Q3%)>ER% THEN QQ%=QQ%-SGN(SG%-Q3%)*K%
6009 FOR VV=1TO200:NEXTVV:VT%=0
6010 IF SP%=1 THEN F%=1
6012 T7=.3
6013 REM
6014 IF T7<> THEN 6013
6020 IF FL%=0 THEN 6014
6025 FS%=0:IF S%=0 THEN VI%=Q5%
6026 IF C2=>15 THEN GOSUB 9040:GOTO 5500
6030 N1%=N1%-SGN(N %):IF N1%=0 OR S%=1 THEN N2%=1:VI%=Q6%:
     N1%=N%+1
6032 PRINT#1 CHR$(27);CHR$(0);"MIN.SETPOINT";
     INT(Q3%*K*10)/10
6033 PRINT#1 CHR$(27);CHR$(17);" / ";
6034 PRINT#1 CHR$(27);CHR$(22); "MAX.SETPOINT";
     INT(Q4%*K*10)/10;
6035 PRINT "SURE TORQUE (TM)"
6040 VP%=1:RP%=1
6041 T8=.2
6042 REM
6043 IF T8<>0 THEN 6042
6045 FOR I=1 TO 200:NEXT I
6047 REM
6048 REM
6050 VC% =1
6051 T4=.2
6052 REM WAIT
6053 IF T4<>0 THEN 6052
```

TABLE II-continued
SOFTWARE PROGRAM

```
6060 VT%=1:RP%=0
6061 T2=.3
6062 REM WAIT
6063 IF T2<>0 THEN 6062
6064 VT%=0
6065 W%=SG%
6100 FOR RK=1TO100:NEXT RK
6101 T3=.1:AC%=R8*SG%+R9:TT%=AC%
6102 REM WAIT
6103 IF T3<>0 THEN 6102
6106 VC%=0
6107 T5=.2
6108 REM
6109 IF T5<>0 THEN 6108
6111 IF SG%<4l THEN 6117
6114 PRINT#1 CHR$(27);CHR$(53);" ";
6115 PRINT#1 CHR$(27);CHR$(40);"TEST TORQUE=";INT
    (AC%*K*10)/10;
6116 GOTO 6118
6117 PRINT#1 CHR$(27);CHR$(40); "TEST TORQUE= 00.0";
6118 PRINT " VI=";VI%;"Q5=";Q5%
6119 REM
6120 REM
6121 IF AP%=0 THEN 6127
6122 C2=C2+1
6123 IF ABS(AC%-Q3%)>ER% THEN Q5=Q5%-SGn(AC%-Q3%)*K%:
    C1=C1+1
6124 IF C2<15 THEN 6128
6125 PRINT#1 CHR$(12);
6126 PRINT#1 CHR$(27);CHR$(40);"READY TO RUN";
6127 PRINT "CAL":QQ%=Q5%
6128 VP%=0:VH%=0
6129 OT%=0:IF N2%=1 THEN VR%=1:IF AC%>Q4% THEN OT%=1
6130 IF N2%=0 THEN VR%=0
6131 IF AC%<MI%THEN VR%=1:RJ%=RJ%+1
6132 PRINT#1 CHR$(27);CHR$(64);"REJECTS";RJ%;
6133 PRINT AC%;MI;SG%:TT%=SG%
6134 IF RJ%>9998 THEN RJ%=0
6135 N2%=0:IF SP%=1 THEN RETURN
6136 IF BL%=0 THEN 6135
6140 IF SP%=1 OR F%=1 THEN RETURN
6150 IF T1=0 THEN 6002
6151 T6=.2
6152 REM
6153 IF T6<>THEN 6152
6160 GOTO 6140
7000 VH%=0:VC%=0:VP%=0
7001 PRINT#1 CHR$(1);
7002 PRINT#1 CHR$(12);
7005 PRINT#1 CHR$(27);CHR$(0);"SET MINIMUM ACCEPTABLE
    TORQUE";
7010 VT%=1
7020 VI%=SE%:Q5%=SE%:RP%=1
7022 RP%=0
7029 FOR I=1TO100:NEXTI
7030 RP%=0
7040 MI%=SG%:Q3%=SG%
7044 PRINT#1 CHR$(27);CHR$(50);" ";
7045 PRINT#1 CHR$(27);CHR$(48);"=";INT(SG%*K*10)/10;
7046 PRINT " MI=";MI%;" SG%=";SG%
7050 IF MN%=1 THEN 7020
7060 VT%=0:RETURN
8002 PRINT#1 CHR$(1):CHR$(12);
8005 PRINT#1 CHR$(27);CHR$(0);"SET MAXIMUM ACCEPTABLE
    TORQUE";
8010 VT%=1
8020 VI%=SE%:Q6%=SE%:RP%=1
8022 RP%=0
8029 FOR I=1TO100:NEXTI
8030 RP%=0
8040 MA%=SG%:Q4=SG%
8044 PRINT#1 CHR$(27);CHR$(50);" ";
8045 PRINT#1 CHR#(27);CHR$(48);"=";INT(SG%*K*10)/10
8046 PRINT " MA=";MA%;"SG=";SG%
8050 IF MX%=1 THEN 8020
8055 Q6%=Q6%*1.25:IF Q6%>4095 THEN Q6%=4095
8060 VT%=0:RETURN
9000 N%=(X1%*800)+(X2%*400)+(X3%*200)+(X4%*100)
9010 N%=N%+(Y1%*80)+(Y2%*40)+(Y3%*20)+(Y4%*10)
9020 N%=N%+(Z1%*8)+(Z2%*4)+(Z3%*2)+Z4%:RETURN
9040 PRINT#1 CHR$(12);
```

TABLE II-continued
SOFTWARE PROGRAM

```
9045 PRINT#1 CHR$(27);CHR$(0);"RETURN CAL/RUN SWITCH TO RUN
     POSITION";
9047 PRINT " "
9055 C2=0
9060 IF RN%=1 THEN 9070
9062 IF RN%=0 THEN 9060
9070 PRINT#1 CHR$(12);
9071 PRINT#1 CHR$(27);CHR$(0); "[READY] PRESS CYCLE START
     TO BEGIN";
9073 PRINT " "
9075 RETURN
10000 F%=0:H1%=500:MT=409.5:ST=10:RJ%=0
10001 K%=4:ER%=2:K=463/4095
10009 HB%=4000:Z%=0
10010 Q1%=10/K:Q2%=90/K:Q3%=Q1:Q4%=Q2%:Q5%=Q1%:Q6%=Q2%:
      RETURN
```

From the foregoing detailed description of a preferred embodiment of this invention, it will be seen that an improved apparatus for testing the release torque of container caps has been provided in which the caps of all of the capped containers outputted by a container capping line may be sequentially, non-destructively, tested for a predetermined release torque, with those that pass the test being passed along for further processing (e.g., packaging and shipping) by the user and those that fail the test being segregated in a reject area for reprocessing or destruction. In addition it will be seen that the improved apparatus included selectively operable means for destructively testing selected capped containers, on a sampling basis, to determine the actual release torque of the container caps on such containers.

While there has been shown and described what is presently considered to be the preferred embodiment of this invention, it will be obvious to those skilled in the art that various changes and modifications may be made without departing from the broader aspects of this invention. It is, therefore, aimed in the appended claims to cover all such changes and modifications as fall within the true spirit and scope of this invention.

What is claimed is:

1. Apparatus for testing for a predetermined minimum release torque of container caps at a torque testing station in said apparatus, said apparatus comprising:
   A. Means for clamping capped containers at said station;
   B. Means for grasping the caps of said containers at said station;
   C. Means connected to said cap grasping means for applying a release torque to said container caps; and
   D. Means including a strain gauge coupled to said release torque applying means for sensing the level of release torque applied to said caps and providing a signal indicative of said level.

2. Apparatus for testing for a predetermined level of minimum release torque of container caps at a torque testing station in said apparatus, said apparatus comprising:
   A. Means for clamping capped containers at said station;
   B. Means for grasping the caps of said containers at said station;
   C. Means connected to said cap grasping means for applying a predetermined level of minimum release torque to said container caps;
   D. Means for sensing the levels of release torque applied to said caps and providing corresponding signals indicative of said levels; and,
   E. Means coupled to both said torque applying means and said sensing means and constructed and arranged to check and selectively adjust the level of said minimum release torque to insure that said minimum release torque is applied at said predetermined level.

3. Apparatus for testing for a predetermined level of minimum release torque of container caps at a torque testing station in said apparatus, said apparatus comprising:
   A. Means for clamping capped containers at said station;
   B. Means for grasping the caps of said containers at said station;
   C. Means connected to said cap grasping means for applying a predetermined level of minimum release torque to said container caps;
   D. Means including a strain gauge coupled to said release torque applying means for sensing the levels of release torque applied to said caps and providing corresponding signals indicative of said levels; and,
   E. Means coupled to both said torque applying means and said sensing means and constructed and arranged to check and selectively adjust the level of said minimum release torque, between applications thereof to said container caps, to insure that said minimum release torque is applied at said predetermined level.

4. Apparatus according to any one of claims 1, 2 or 3, and further including display means coupled to said sensing means for providing a readout of the level of the release torque applied to a container cap at said station.

5. Apparatus according to any one of claims 1, 2 or 3, wherein said release torque applying means applies a progressively increasing amount of release torque to said container caps at said station, up to a level equal to the level of said minimum release torque, in the case of a container cap at said station which does not release while said release torque is progressively increasing.

6. Apparatus according to claim 5, and further including display means coupled to said sensing means for providing a readout of the level of the release torque applied to a container cap at said station.

7. Apparatus according to claim 5, and further including means selectively coupleable to said release torque applying means and operable to progressively increase said release torque to a predetermined over-torque level that is greater than said minimum release torque level for positively releasing the container cap that is at said station when said release torque is progressively increasing toward said predetermined over-torque level.

8. Apparatus according to claim 7, and further including display means coupled to said sensing means for providing a readout of the level of the torque at which the cap at said station released.

* * * * *